United States Patent [19]

Chang et al.

[11] Patent Number: 5,449,293
[45] Date of Patent: Sep. 12, 1995

[54] RECOGNITION TRAINING SYSTEM

[75] Inventors: Ernest J. Chang; Carl Gutwin, both of Calgary, Canada

[73] Assignee: Alberta Research Council, Edmonton, Canada

[21] Appl. No.: 889,941

[22] Filed: Jun. 2, 1992

[51] Int. Cl.⁶ .............................................. G09B 29/10
[52] U.S. Cl. .................................. 434/322; 434/322; 434/327
[58] Field of Search .................. 364/419; 434/322, 323, 434/327, 335, 336, 153, 130

[56] References Cited

U.S. PATENT DOCUMENTS 4,978,302 12/1990 Clossey .
5,065,345 11/1991 Knowles et al. ................ 434/323 X

FOREIGN PATENT DOCUMENTS 0313976 5/1989 European Pat. Off. .
2229030 9/1990 United Kingdom .
90/05350 5/1990 WIPO .

OTHER PUBLICATIONS

Mitchell et al, "A Computer-controlled Video Disc System for Teaching White Cell Morphology and Differential Counting to Medical Technology Students", *Journal of Medical Technology*, vol. 2:10, Oct. 1965, pp. 655–658.
Computers in Cardiology, Sep. 23, 1991, IEFF Computer Society Press, Venice, II, B. Larson.
"Learning about Cardiac Pacemakers by an Interactive Computer Program"; pp. 517–520.

*Primary Examiner*—Richard J. Apley
*Assistant Examiner*—Glenn E. Richman
*Attorney, Agent, or Firm*—Hoffman, Wasson & Gitler

[57] ABSTRACT

The Recognition Training System (RTS) incorporates a new and innovative process which facilitates the training of a person to rapidly and accurately distinguish between members of a set of entities, through the trainee interacting with RTS. The methodology of RTS involves the presentation of one or more attributes associated with an entity, while the trainee attempts to identify by name the entity, or the trainee may request that specific entities and associated attributes be shown for reference purposes. RTS supports an interactive training process which is almost completely self directed and affords a trainee an opportunity to make distinctions between similar entities by employing a two stage presentation facility. Attributes presented may be in the form of descriptive text, bitmap images, audio, and still and motion video.

31 Claims, 36 Drawing Sheets

FLOW OF REQUESTS BETWEEN SYSTEM AGENTS

| LEFT STAGE MANAGER | | |
|---|---|---|
| FROM USER PROXY | FROM LEARNING SET MANAGER | |
| A<br>Please make changes to the display(s) of the Left Stage<br>5A | B [<-U:7A/B]<br>Please show the name of the Left Entity (Left Entity-Name)<br><br>Action: display Left Entity-Name | C [<- 3B/B; 3E/C]<br>Here is an Entity-Name. Please display the corresponding Entity on the Left Stage<br><br>Action: display new Left Entity on Left Stage using Left settings for text and Entity-Attribute | D [<-3A/D]<br>Please reset the Left Stage<br><br>Action: Blank Left Stage and turn off Text and List Displays |

FIG. 3

REQUESTS TO CHANGE DISPLAYS ON LEFT OR RIGHT STAGE

The Stage Managers take actions appropriate to the Requests listed below

| REQUEST | ACTION | ADDITIONAL ACTION |
|---|---|---|
| Select Entity-Attribute | as requested | Display appropriate text if text is visible |
| Display a Different Instance of the Entity-Attribute | | |
| Display/Hide Text | as requested | |
| Scroll Text | | |
| Show Features for Bitmap or VideoStill if present | | |
| Animate VideoClip or Audio - play, stop, rewind, etc | | |
| Select List/Text Mode for Specifying Entity-Name | as requested | Display or hide Entity-Set List as appropriate |

FIG. 5

RECOGNITION TRAINING SYSTEM

BACKGROUND OF THE INVENTION

The invention relates to recognition training and, more particularly, to a system and process for training persons to recognize and identify specific objects or entities.

The classical technique for recognition training involves the use of flash cards or other means for showing aspects (ie. views) of an entity which is to be identified by a trainee with a human trainer managing the presentation of the entity views. An extension of this technique is the use of multiple views to represent a single entity so as to achieve a more complete recognition of the entity by approaching it from several angles or aspects.

However such a technique has limited effectiveness in teaching the recognition of an entity within a set of entities which share some common or very similar characteristics. One disadvantage of this technique is that the trainee has no physical control over which views of an entity are presented and the rate at which they are shown, relying totally on the skills and, to some extent, patience of the trainer. Secondly when the trainee attempts to identify the entity from the view presented, he typically is advised of whether the guessed name was correct or not. For incorrect guesses, the trainee is not offered an opportunity to examine a view of the guessed entity, if such exists, and compare it to the entity that is to be identified. This approach is not generally employed with flash cards because finding the guessed entity is either too slow or impractical. This is rather unfortunate since such an approach would be a very powerful teaching tool.

One development in the field of recognition training is disclosed in an article appearing in the October 1985, Vol 2:10 issue of the Journal of Medical Technology by Mitchell, McNeely and Chang entitled "A Computer-controlled Video Disc System for Teaching White Cell Morphology and Differential Counting to Medical Technology Students". The system described displays text on a computer video terminal and full color images on a television screen. The functional operations offered include displaying cells and descriptive text, and testing the student's knowledge. However, this system does not present these cell characteristics in a dual fashion, thereby permitting the students to examine more closely incorrect identifications by comparison of the characteristics.

SUMMARY OF THE INVENTION

It is an object of the invention to facilitate the training of a person to recognize specific entities, while overcoming the disadvantages of conventional recognition training techniques.

It is another object of the invention to provide an environment and a process in which ambiguities in the trainee's mental models are immediately brought to the front, and opportunities for making distinctions are presented in being able to make comparisons.

It is a further object of the invention to provide a training process which is almost completely self directed.

It is yet a further object of the invention to provide the trainee with an opportunity to learn positively with every action.

Therefore, in accordance with one aspect of the invention, there is provided a recognition training system for teaching a trainee to identify an entity within a set of entities, said entities having one or more attributes associated therewith, comprising, a first stage and a second stage presentation means for presenting to said trainee said one or more attributes, input means used by said trainee for interacting with said recognition training system; and processing means connected to said first stage and said second stage presentation means and to said input means, said processing means operating in a first mode, wherein an attribute associated with said entity to be identified is presented to said trainee by said processing means at said first stage presentation means, said trainee attempting to identify said entity inputs an entity-name identifier via said input means, said processing means receiving said identifier determines if said identifier correctly identifies said entity presented at said first stage, and when said identifier is incorrect but does identify another entity within said set of entities, an attribute associated with said another entity is presented to said trainee at said second stage presentation means for comparison with the attribute associated with the entity to be identified.

Various types of attributes, such as text, sound, bitmap image, still video and motion video, are contemplated.

In the case of sound or motion video the attribute would normally be presented sequentially but for other types of attributes, they would most conveniently be presented on left and right portions of a display screen.

According to another broad aspect of the invention, there is provided a recognition training system for teaching a trainee to identify an entity within a set of entities, said entities having one or more attributes associated therewith, comprising: a first stage and a second stage presentation means for presenting to said trainee said attributes; input means used by said trainee for interacting with said recognition training system; and processing means connected to said first stage and said second stage presentation means and to said input means, wherein said trainee inputs an identifier identifying a first entity, and said processing means presents an attribute associated with said first entity at said first stage presentation means and presents another attribute associated with said first entity at said second stage presentation means.

According to a further broad aspect of the invention, there is provided a recognition training system for teaching a trainee to identify an entity within a set of entities, said entities having one or more attributes associated therewith, comprising: a first stage and a second stage presentation means for presenting to said trainee said attributes; input means used by said trainee for interacting with said recognition training system; and processing means connected to said first stage and said second stage presentation means and to said input means, wherein said trainee inputs an identifier identifying a first entity and said processing means presents an attribute associated with said first entity at said first stage presentation means, and said trainee inputs another identifier identifying a second entity and said processing means presents an attribute associated with said second entity at said second stage presentation means.

According to a still further broad aspect of the invention, there is provided a recognition training system for teaching a trainee to identify an entity within a set of entities, said entities having one or more attributes associated therewith and each attribute having one or more instances, comprising: an audio/visual output device having a display area divided into at least first and second display portions and having a speaker; input means used by the trainee for interacting with said recognition training system and forming part of the audio/visual output device; and processing means forming part of the audio/visual output device and connected to the display portions, speaker and input means, said processing means operating in a first mode, wherein an instance of an attribute associated with said entity to be identified is presented to said trainee by said processing means at said first display portion or at said speaker, said trainee attempting to identify said entity inputs an identifier via said input means, said processing means receiving said identifier determines if said identifier correctly identifies said entity, and when said identifier is incorrect but does identify another entity within said set of entities, an instance of an attribute associated with said another entity is presented to said trainee at said second display portion or at said speaker for comparison with the attribute associated with the entity to be identified.

The Recognition Training System (RTS) of the invention incorporates a new and innovative process which facilitates the training of a person to rapidly and accurately distinguish between members of a set of entities, through the trainee interacting with the RTS. The process that is used in RTS involves the presentation of one or more attributes associated with an entity, with the trainee attempting to identify by name the entity, or requesting that specific entities and associated attributes be shown to the trainee for reference purposes.

RTS supports training processes which are almost completely self-directed, in which the concept of incorrect identification is replaced by that of an exploration in nearness in concept space to the target. In other words, the meaning of the "mistake" in a wrong guess is that it is the closest in the trainee's mind to the target, and needs most to be distinguished, through better knowledge of the named entity and the distinctions between it and the target entity.

BRIEF DESCRIPTION OF THE DRAWINGS

In order that the invention may be more clearly understood, an embodiment will be described with reference to the figures in the accompanying drawings, in which:

FIGS. 2 to 16 depict the recognition training system process architecture in terms of the details of its functional capabilities;

DESCRIPTION OF A PREFERRED EMBODIMENT

Figure 1:
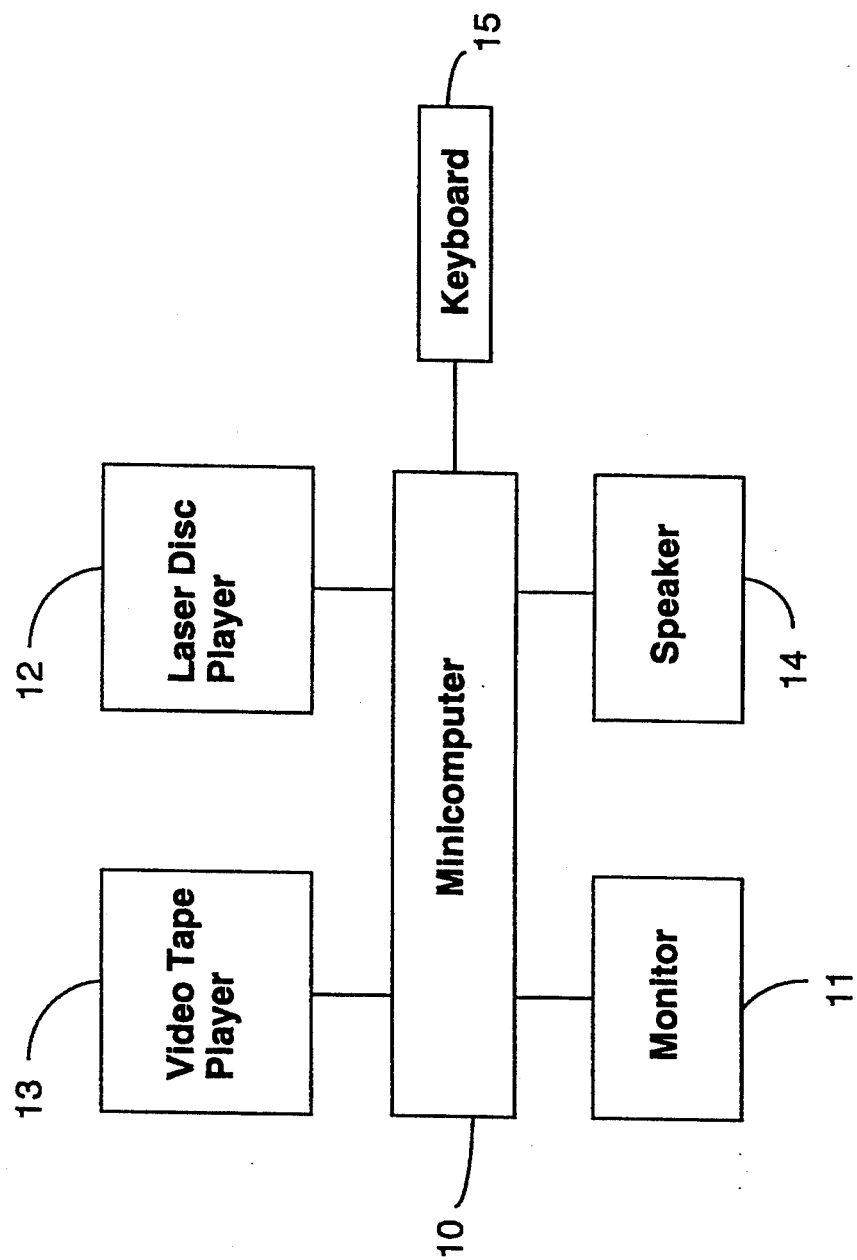
FIG. 1 is a simplified, functional, block diagram of an embodiment of a recognition training system.

The following general description is to provide an overview of the Recognition Training System and the methodology it employs.

The RTS system operates with a collection of objects known as an ENTITY-SET wherein an object is referred to as an entity. Each entity can have one or more unique ENTITY-NAMEs, while all the entities within a set share a collection of ENTITY-ATTRIBUTEs.

An ENTITY-ATTRIBUTE is a representation of an aspect of the entity. The representation may be in the form of, for example, a bitmap image, video (ie. videostill or videoclip), text or an audio recording, which is the ATTRIBUTE-TYPE. Each ENTITY-ATTRIBUTE is given an ATTRIBUTE-NAME and an associated piece of ATTRIBUTE-TEXT, and each ENTITY-ATTRIBUTE can have several examples, called ATTRIBUTE-INSTANCEs. It is these ENTITY-ATTRIBUTEs that RTS presents to a trainee for identification of a given entity.

As an illustration, in an ENTITY-SET of woodpeckers, a woodpecker entity may have several aliases, such as red-headed woodpecker or red-headed. These aliases would be used as ENTITY-NAMEs for this particular woodpecker entity. Several ENTITY-ATTRIBUTEs may be used to represent the ENTITY-SET of woodpeckers. These attributes might have ATTRIBUTE-NAMES such as portrait, song, flight and silhouette, with corresponding ATTRIBUTE-TYPEs of bitmap, audio, video and bitmap. Each ENTITY-ATTRIBUTE may have ATTRIBUTE-TEXT describing its specific characteristics. Also for a given woodpecker there can be from zero to many ATTRIBUTE-INSTANCEs of a particular ENTITY-ATTRIBUTE. For example the portrait ENTITY-ATTRIBUTE of the red-headed woodpecker may have three ATTRIBUTE-INSTANCEs, two of them being of ATTRIBUTE-TYPE bitmap, and the other of ATTRIBUTE-TYPE videoclip.

RTS uses two separate areas to present ENTITY-ATTRIBUTEs to a trainee, a LEFT STAGE and a RIGHT STAGE. The trainee can request the RTS to use specific and possibly different ENTITY-ATTRIBUTEs in displaying entities on the LEFT and RIGHT STAGEs. The corresponding ATTRIBUTE-TEXT can be made visible or hidden, upon request, and if visible when the trainee changes the ENTITY-ATTRIBUTE being shown, will be updated according. At any time, the trainee can also ask to have a different ATTRIBUTE-INSTANCE shown. Some ENTITY-ATTRIBUTEs require further action on the part of the trainee, such as starting a videoclip, stopping it, playing it in slow-motion, and so on.

There are two ways that a trainee can submit an ENTITY-NAME for an entity presentation at one of the stages: the first is to volunteer the name (by typing or speaking it), and the second is to select an ENTITY-NAME from an ENTITY-LIST SET, which can be displayed upon the request of the trainee. The name thus given to RTS by the trainee is called the USER-SUBMITTED-NAME.

RTS uses two modes, REFERENCE and CHALLENGE, in which trainees work with the entities. In REFERENCE mode, trainees can examine entities in the LEFT or RIGHT STAGEs by giving an ENTITY-NAME to RTS. The trainee has the flexibility of comparing different entities, or different attributes of the same entity, using the two stages. In CHALLENGE mode, the RTS system generates the display of an attribute of the entity to be identified on one stage, the LEFT STAGE for instance, using the ENTITY-ATTRIBUTE currently selected. The entity presented is called the TARGET ENTITY. The trainee must now identify the entity by name, and if the USER-SUBMITTED-NAME is incorrect but does correspond to an entity in the ENTITY-SET, the entity will be shown on the RIGHT STAGE.

This two stage presentation is of value in correcting two errors: the insufficient knowledge of the RIGHT STAGE entity, which would not have been submitted if the trainee knew the guessed entity well enough, and the confusion of it for the TARGET ENTITY. The comparison thus reinforces the association between the RIGHT STAGE entity and its name, while decreasing any association between the TARGET ENTITY and the guessed entity name. Furthermore, the comparison serves to provide knowledge of distinctions between the TARGET ENTITY and RIGHT STAGE entity. The user can continue guessing the name of the TARGET ENTITY, and be shown the entities corresponding to the incorrect names submitted, or can ask the system to show the TARGET ENTRY name.

Note that the trainee is learning the identification of entities, and distinguishing between them, by specific ENTITY-ATTRIBUTES, such as portrait or bird song or heart sound. For more complex entities, it may be necessary to view several attributes before an entity can be named correctly, such as in some medical diagnoses.

Some ATTRIBUTE-TYPEs permit a further level of knowledge to be given to the trainee. In images which are static, such as bitmap or videostill, the RTS system can provide LABELS and TAGS that point to certain aspects of the image. These features are not shown automatically whenever an ATTRIBUTE-INSTANCE of the right type is shown, but need to be requested by the trainee. Thus the trainee can attempt to identify the entity from the specific ATTRIBUTE-INSTANCE being shown without resorting to the prompts and hints that may be essential to the learning process but not at an expert level of identification.

With RTS operating in REFERENCE mode, the current or active ENTITY-SET from which entities are examined by the trainee is called the REFERENCE SET. Operation in CHALLENGE mode draws entities to be identified from a LEARNING SET which is always a subset of (or the same as) the current REFERENCE SET. The <LEARNING SET;REFERENCE SET> pair make up a BOOK.

There are two cases in which the LEARNING SET is smaller than the REFERENCE SET. The first is called INCREMENTAL LEARNING, in which the trainee specifies that the set from which a TARGET ENTITY is chosen should be a small subset of the REFERENCE SET. For example, if there are 40 entities in a REFERENCE SET, one learning strategy may be to work with 4 entities at a time. The second case permits the trainee to select items in the REFERENCE SET and place them into a subset called the OWN ENTITY-SET, which becomes the new LEARNING SET. For example, a trainee may be having problems distinguishing between the white round entities in the REFERENCE SET. If the REFERENCE SET is large, each such entity does not appear frequently as a TARGET ENTITY in CHALLENGE mode. The trainee can place them into the OWN ENTITY-SET as the new LEARNING SET, and TARGET ENTITIES will then be drawn only from them.

Furthermore, TARGET ENTITIES are drawn from LEARNING SETs using a strategy of no replacement until the LEARNING SET is empty so each entity is drawn randomly without duplication till all have been chosen. INCREMENTAL LEARNING further modifies this strategy by increasing the probability of drawing entities for which incorrect identifications have been made, and by removing an entity that has been correctly identified several times from the LEARNING SET, replacing it with a new entity form the REFERENCE SET, till all entities have been correctly identified.

The trainee interacts with RTS by first selecting an active BOOK (i.e. set of entities from a group of such sets which may be available). The active BOOK's LEARNING SET and REFERENCE SET are used for the LEFT and RIGHT STAGEs respectively. The trainee can start in either REFERENCE or CHALLENGE mode. CHALLENGE mode is specified at any time simply by asking RTS to generate a new TARGET ENTITY to be shown on the LEFT STAGE, using the currently selected ENTITY-ATTRIBUTE for the LEFT STAGE. Once the entity has been shown, the trainee is not restricted in terms of actions. Another TARGET ENTITY may be requested immediately; an ENTITY-NAME may be selected for display on the RIGHT STAGE; a different attribute for the TARGET ENTITY may be selected; or the ATTRIBUTE-TEXT may be requested. It is only if the trainee submits an identification for the TARGET ENTITY that the system either acknowledges a correct identification, or shows the named entity on the RIGHT STAGE, using the attribute being shown in the LEFT STAGE for compatibility reasons.

A more specific description of the RTS system is to follow discussing an embodiment of the invention realized, with reference being made to the attached drawings.

Referring to FIG. 1, there is shown a simplified, functional, block diagram of a recognition training system configuration. Conventional hardware elements are integrated with the heart of the system being a minicomputer 10. Coupled to the minicomputer 10 is a CRT monitor 11, a laser disc player 12, a video tape player 13, an audio speaker 14 and a keyboard 15. The new and innovative process of RTS is best realized as a computer program which has been written in the Smalltalk programming language, and can be used on all platforms that Smalltalk and its variants will execute, including IBM PCs and clones, Apple Macintosh systems, workstations and other computer systems.

Figure 2:
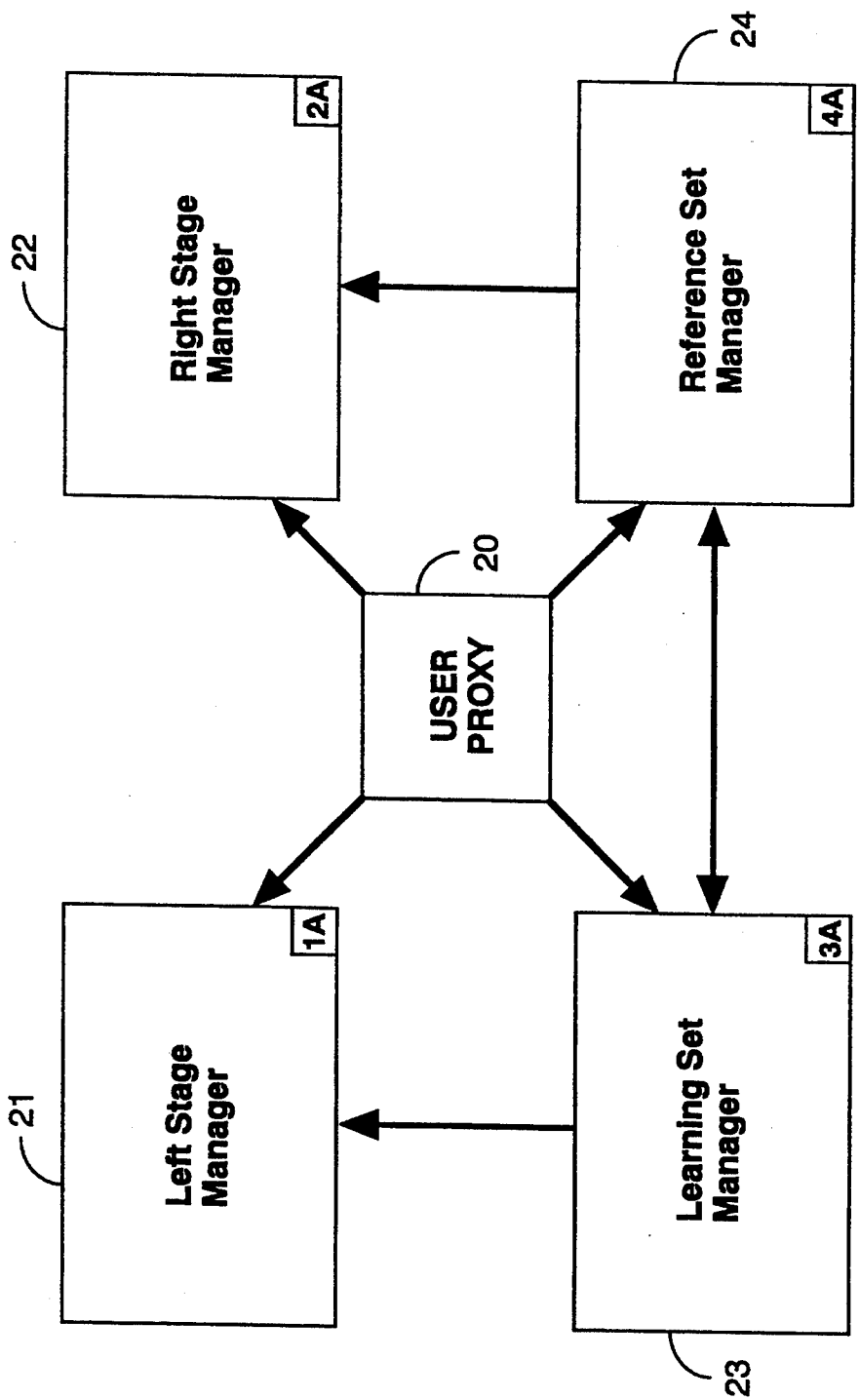

Turning to FIGS. 2 to 16, the RTS process architecture is presented in terms of details of its functional capabilities. FIG. 2 depicts the general organization of the RTS system process as comprising five system agents or subprocesses and the message communications between them. The messages in the system are called requests. Requests from a user are handled by the User Proxy 20 and originate from the actions of the trainee in working with the recognition training system. The requests are then directed accordingly to the Left Stage Manager 21, the Right Stage Manager 22, the Learning Set Manager 23 and the Reference Set Manager 24. The Left Stage Manager 21 and the Right Stage Manager 22 are responsible for the LEFT and RIGHT STAGEs respectively, where information about entities is shown. The Learning Set Manager 23 and Reference Set Manager 24 handle the entity set contents that are to be shown on the stages, these being the LEARNING SET and the REFERENCE SET for the LEFT and RIGHT STAGES respectively.

Figure 28:
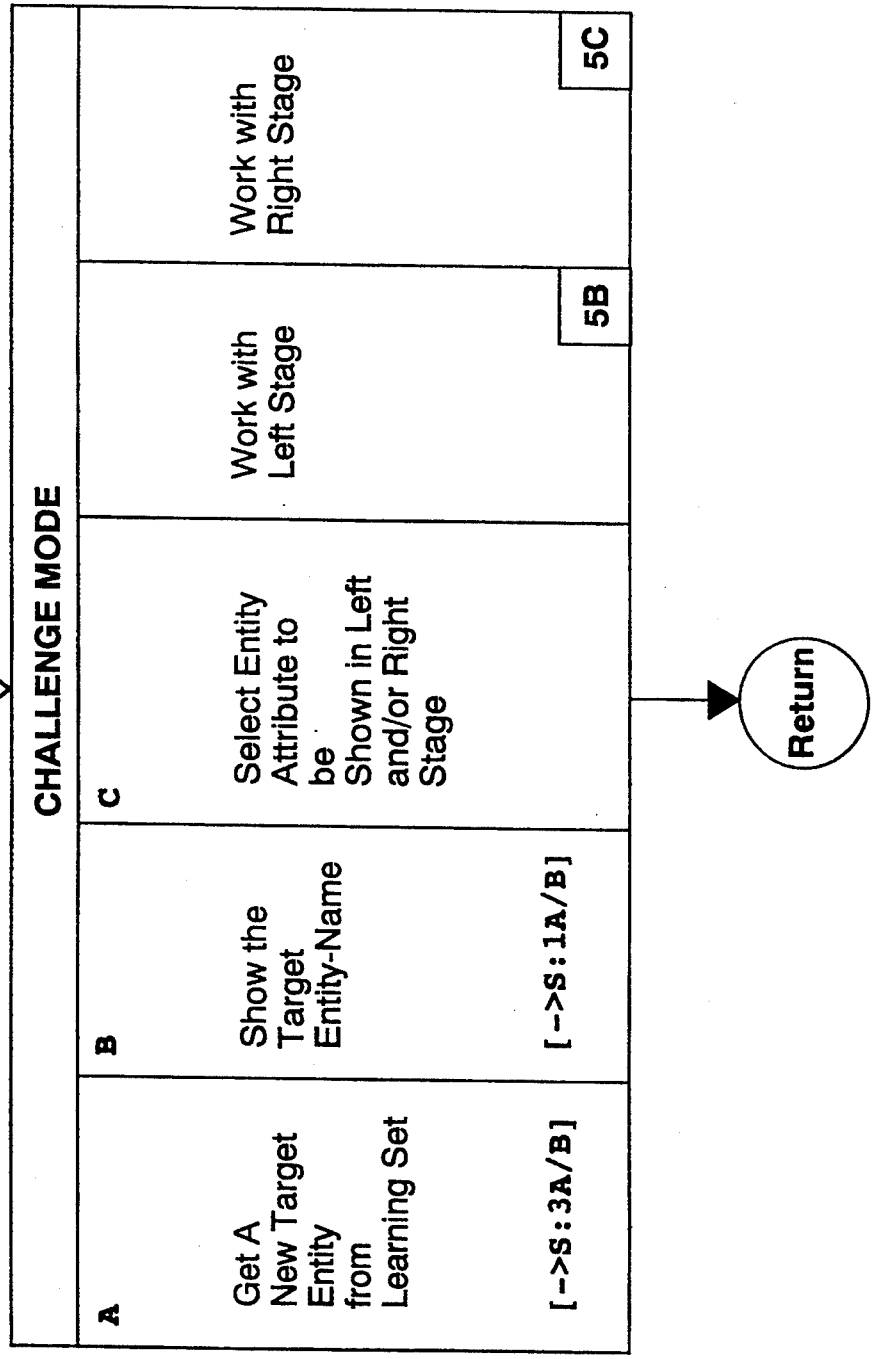

Examining the Left Stage Manager 21 in more detail, FIG. 3 shows the internal structure of this system component. The Left Stage Manager 21 may receive multiple message requests from two sources, the User Proxy 20 and the Learning Set Manager 23. One request the User Proxy 20 submits to the Left Stage Manager 21 is to make changes to the display of the LEFT STAGE, as indicated in section A of FIG. 3. The extent of these changes will be explained when reference is made to FIG. 5. A second request by the User Proxy 20, noted in section B of FIG. 3, is for the Left Stage Manager 21 to display the name of the LEFT STAGE entity, the left ENTITY-NAME. This request originates from the trainee while RTS is operating in CHALLENGE mode (see FIG. 28 section B). Indicated in section C of FIG. 3 is one request the Learning Set Manager 23 can make of the Left Stage Manager 21. When a USER-SUBMITTED-NAME is entered by the trainee while RTS is in REFERENCE mode (FIG. 6 section B) or after a new TARGET ENTITY is selected from the active LEARNING SET (FIG. 9 section C), the Learning Set Manager 23 requests the Left Stage Manager 21 to display the new entity on the LEFT STAGE using the current LEFT STAGE settings for text and ENTITY-ATTRIBUTE. The final request possible by the Learning Set Manager 23 for the Left Stage Manager 21 is to reset the LEFT STAGE. Upon receipt of such a request, the Left Stage Manager 21 will blank the LEFT STAGE and turn off text and list displays. Once the Left Stage Manager 21 has completed processing of a request, similarly for all system agents of the RTS process, it returns to awaiting receipt of further commands.

Figure 4:
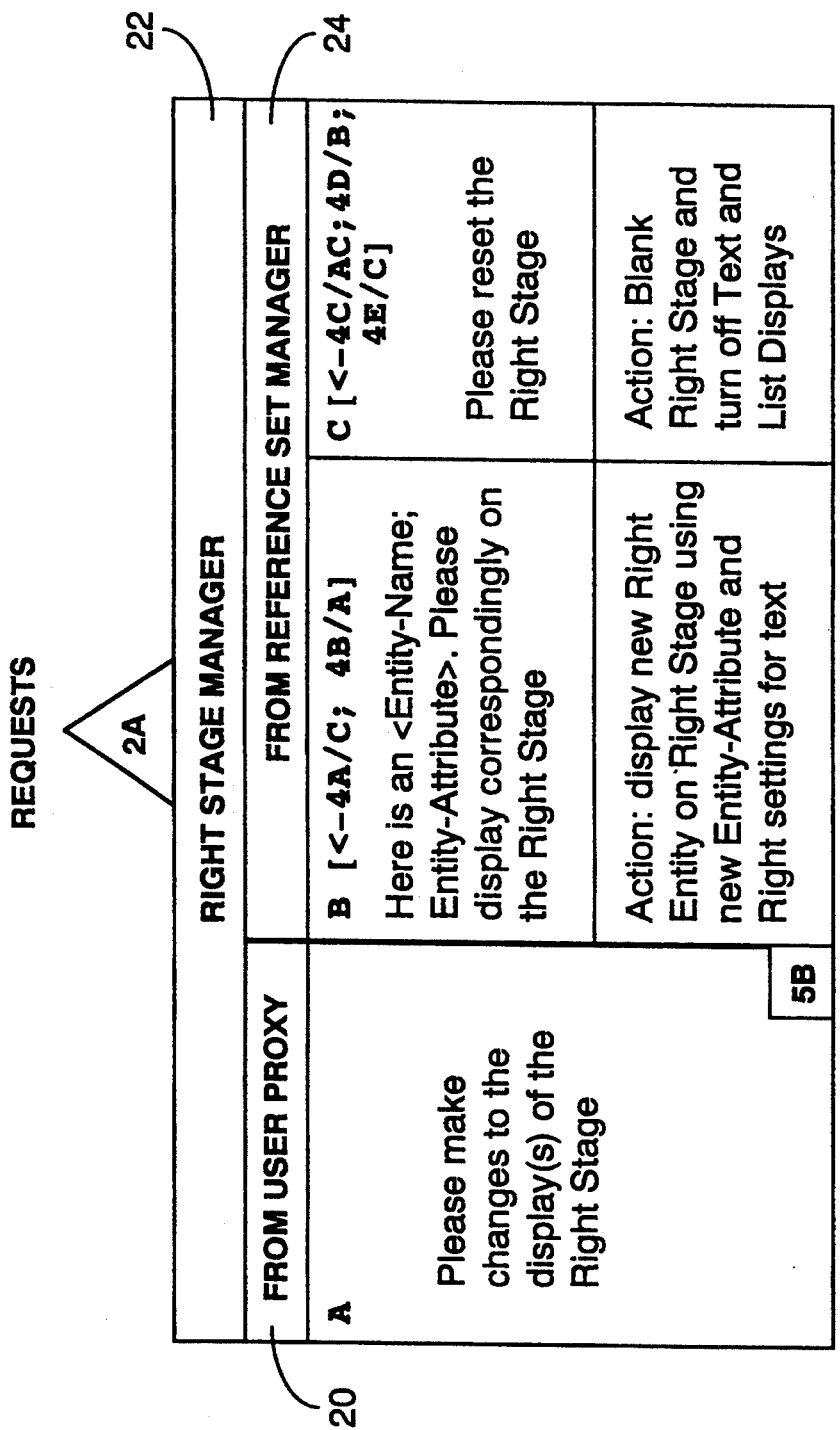

With regard to FIG. 4, a more detailed view of the Right Stage Manager 22 is presented. This particular module of the RTS system process is coupled for communication with the User Proxy 20 and the Reference Set Manager 24. As with the Left Stage Manager 21 (FIG. 3), the User Proxy 20 can request the Right Stage Manager 22 to make changes to the display of the RIGHT STAGE. These changes will be described in the paragraph to come with regard to FIG. 5. Looking at messages from the Reference Set Manager 24 under section C of FIG. 4, whenever a trainee enters the ENTITY-NAME of an entity in order to have a specific ENTITY-ATTRIBUTE displayed during REFERENCE mode operation on the LEFT STAGE, if the particular entity should have more than one attribute associated with it, then a second ENTITY-ATTRIBUTE of the entity specified is displayed on the RIGHT STAGE on request by the Reference Set Manager 24 which actually originates from a request by the Learning Set Manager 23 shown in FIG. 11 section C. The request described in FIG. 4 section C is also initiated by Reference Set Manager 24 when the trainee submits an ENTITY-NAME particularly for display on the RIGHT STAGE (FIG. 12 section A). A further request by the Reference Set Manager 24 to the Right Stage Manager 22 is to reset the RIGHT STAGE identical to the LEFT STAGE reset.

FIG. 5 illustrates the possible requests that can be made by the User Proxy 20 to the Left Stage Manager 21 and the Right Stage Manager 22 to change the displays on the LEFT and RIGHT STAGEs respectively. On commands entered by the trainee, the Left and Right Stage Managers 21 and 22 will: select another ENTITY-ATTRIBUTE; display a different instance of the ENTITY-ATTRIBUTE; display or hide text; scroll text; show features or labels for bitmap or videostill attributes if present; animate videoclip or audio play, stop, rewind, etc; or select list/text mode for specifying ENTITY-NAMEs.

Figure 6:
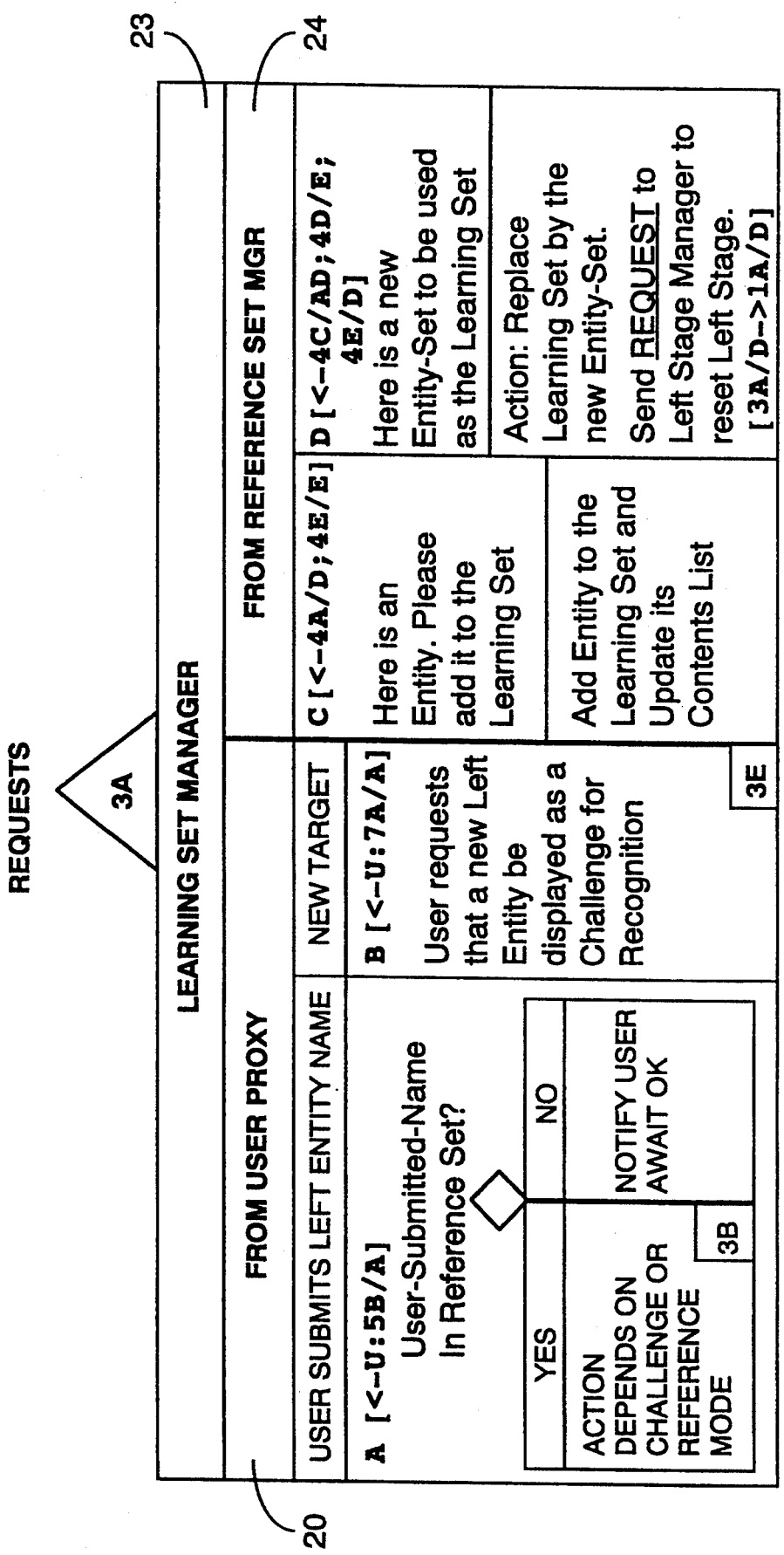
Figure 7:
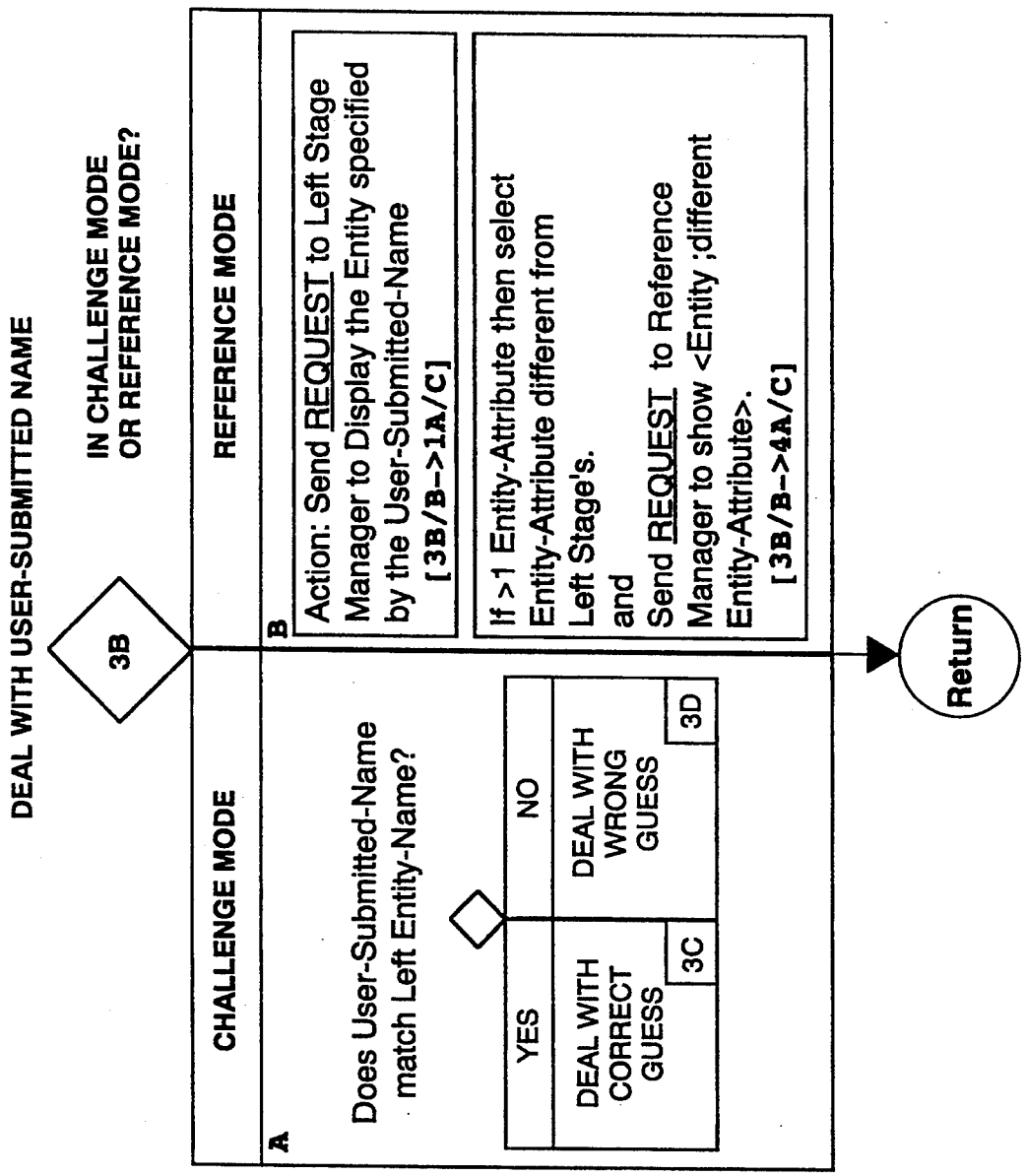

The internal structure of the Learning Set Manager 23 is shown in FIG. 6 comprising four possible processing paths, two for requests received from the User Proxy 20 and two for messages received from the Reference Set Manager 24. Section A is the logical path executed by the Learning Set Manager 23 as a result of the trainee inputting an ENTITY-NAME for the LEFT STAGE entity. If this USER-SUBMITTED-NAME is not found in the REFERENCE SET, the trainee is notified and upon receiving an acknowledgement by the trainee, the Learning Set Manager 23 returns to awaiting receipt of another request. If the USER-SUBMITTED-NAME is found in the REFERENCE SET, the next action executed is dependent on the operation mode of RTS as depicted in FIG. 7. Section B of this diagram indicates that the action performed when a USER-SUBMITTED-NAME is entered with RTS operating in REFERENCE mode is to first send a request to the Left Stage Manager 21 to display the entity specified by the USER-SUBMITTED-NAME and second, if there is more than one ENTITY-ATTRIBUTE associated with the entity identified by the USER-SUBMITTED-NAME, an ENTITY-ATTRIBUTE different than the LEFT STAGE's is selected and a request is sent to the Reference Manager 24 to show the different ENTITY-ATTRIBUTE. The Reference Set Manager 24 then requests the Right Stage Manager 22 to display the ENTITY-ATTRIBUTE on the RIGHT STAGE.

Figure 8:
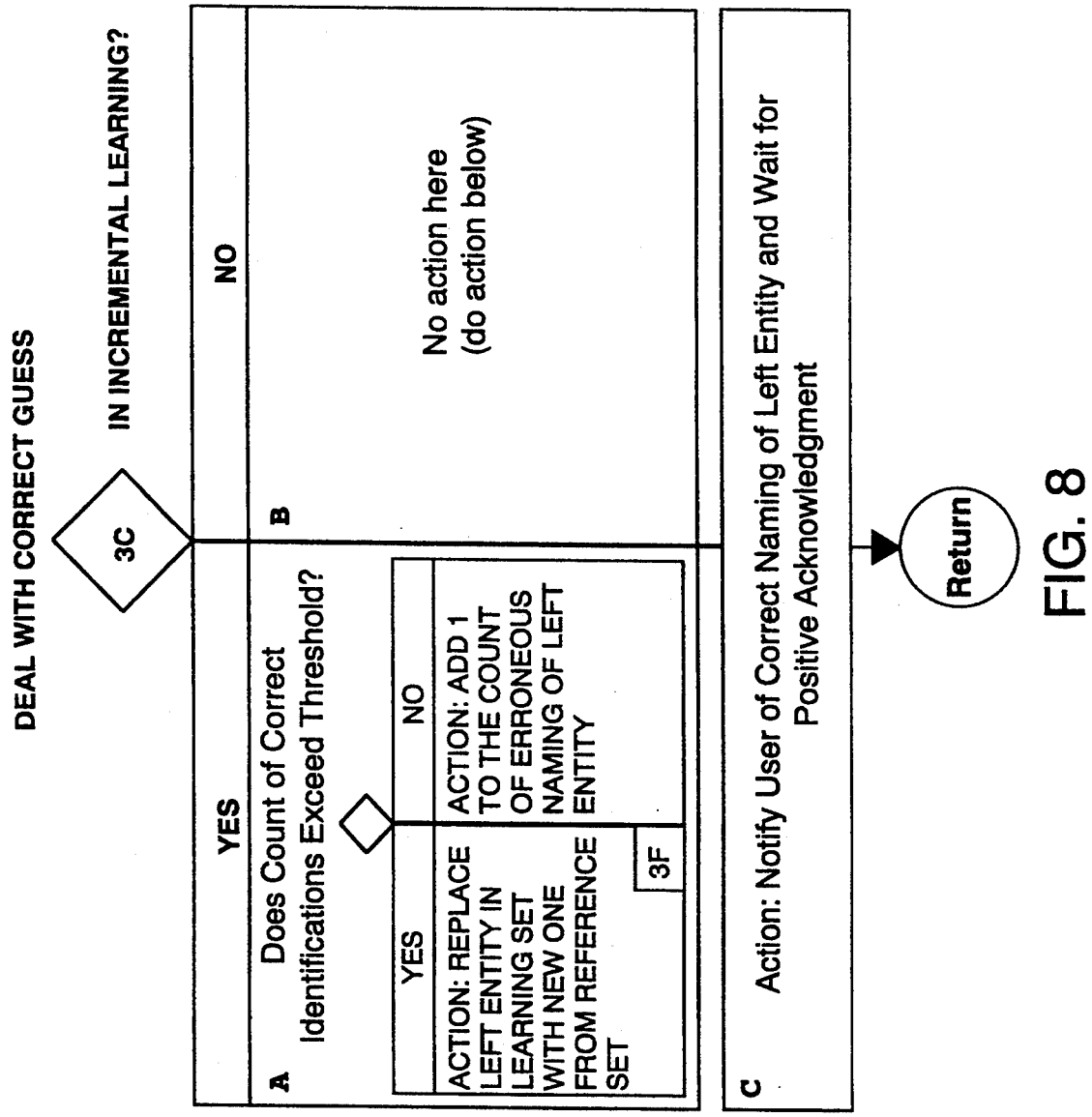

In CHALLENGE mode operation, FIG. 6 section A, the Learning Set Manager determines if the USER-SUBMITTED-NAME matches the left ENTITY-NAME. The logic flow for a correct entry is shown in FIG. 8, in which the next step executed is related to INCREMENTAL LEARNING. If the INCREMENTAL LEARNING function has been activated by the trainee, then the count of correct identifications is checked. If this value does not exceed the threshold specified upon INCREMENTAL LEARNING initiation, then one is added to the count for correct identifications and the trainee is notified of his correct naming of the left entity. Otherwise, when the count exceeds the threshold value the left entity in the LEARNING SET is replaced with a new one from the REFERENCE SET and then the trainee is notified of the correct identification.

Figure 11:
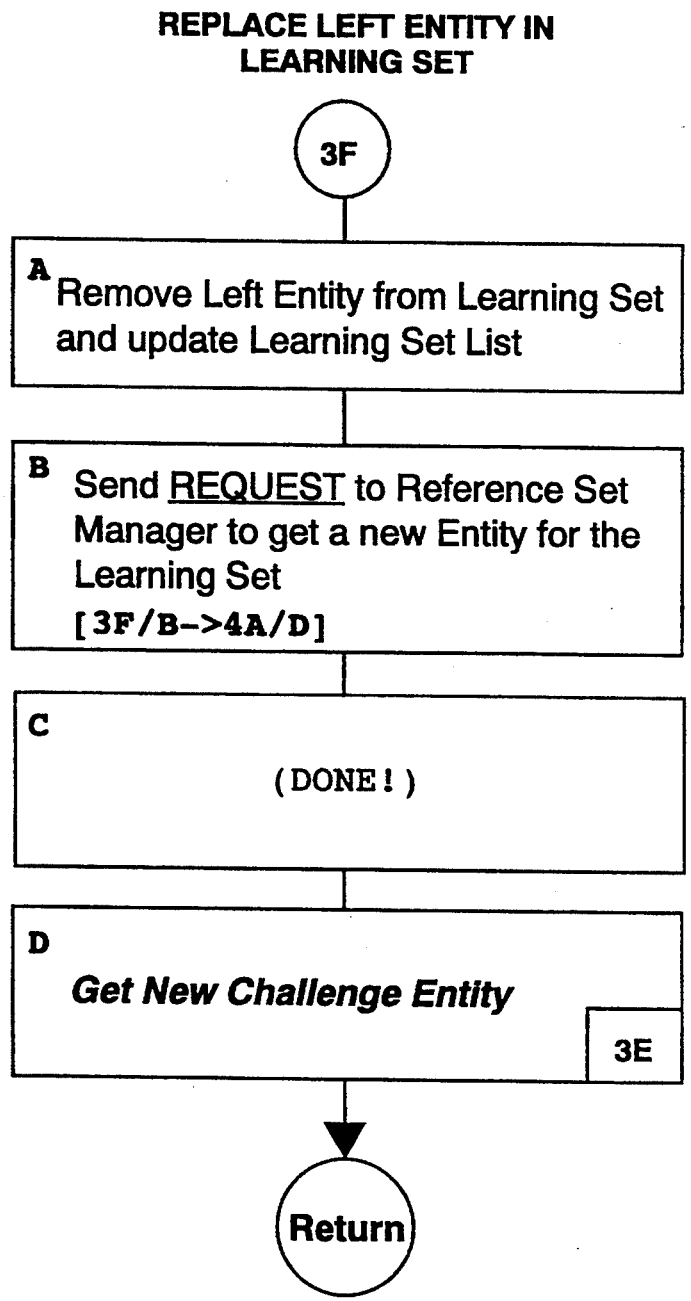
Figure 12:
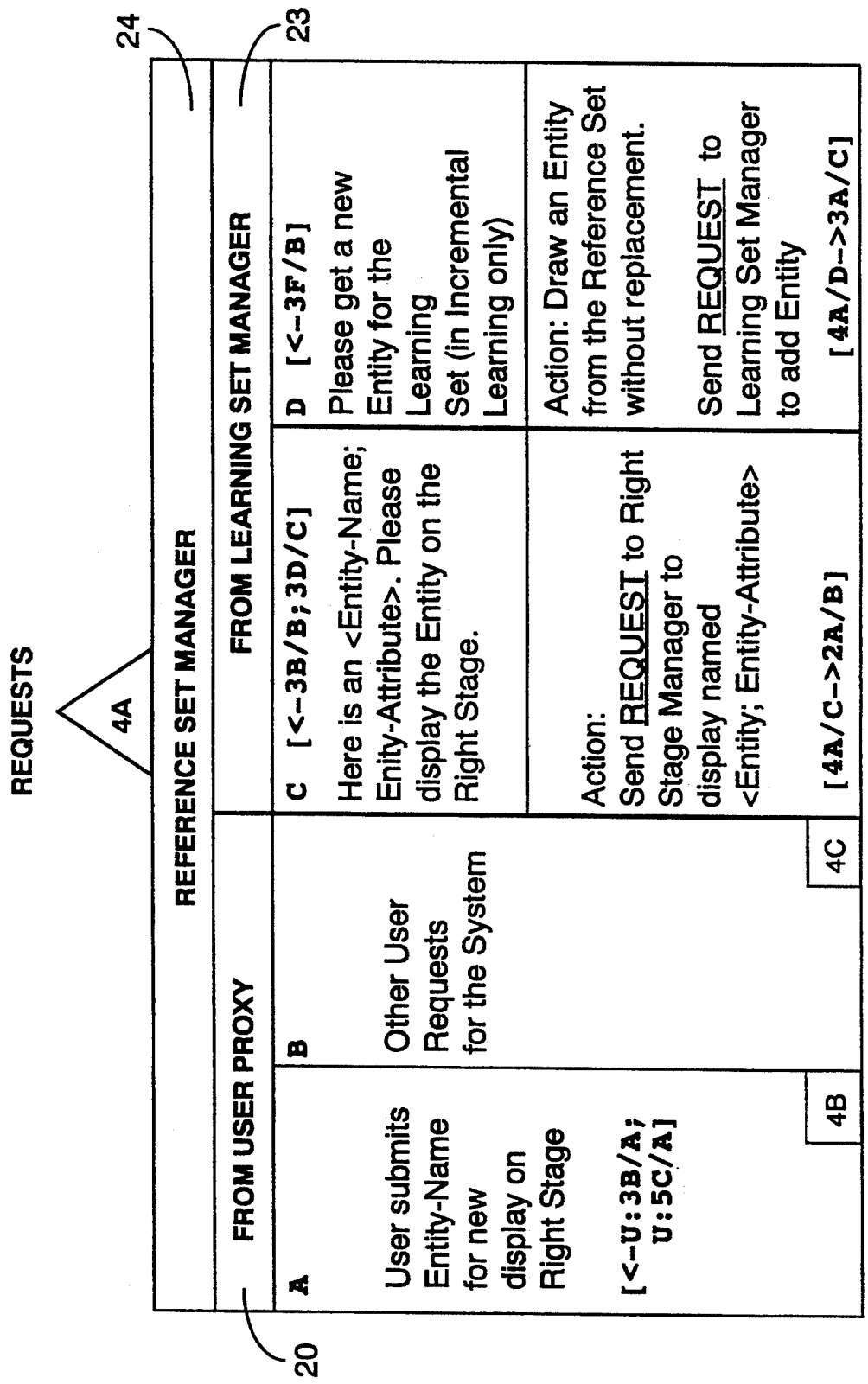

FIG. 11 illustrates the steps executed when replacing the left entity in the LEARNING SET. First the left entity is removed from the LEARNING SET and the LEARNING SET list is updated. Next a request is sent to the Reference Set Manager 24 to retrieve a new entity for the LEARNING SET (FIG. 12 section D). When a new entity has been received from the Reference Set Manager 24, a new challenge entity must be drawn.

Figure 10:
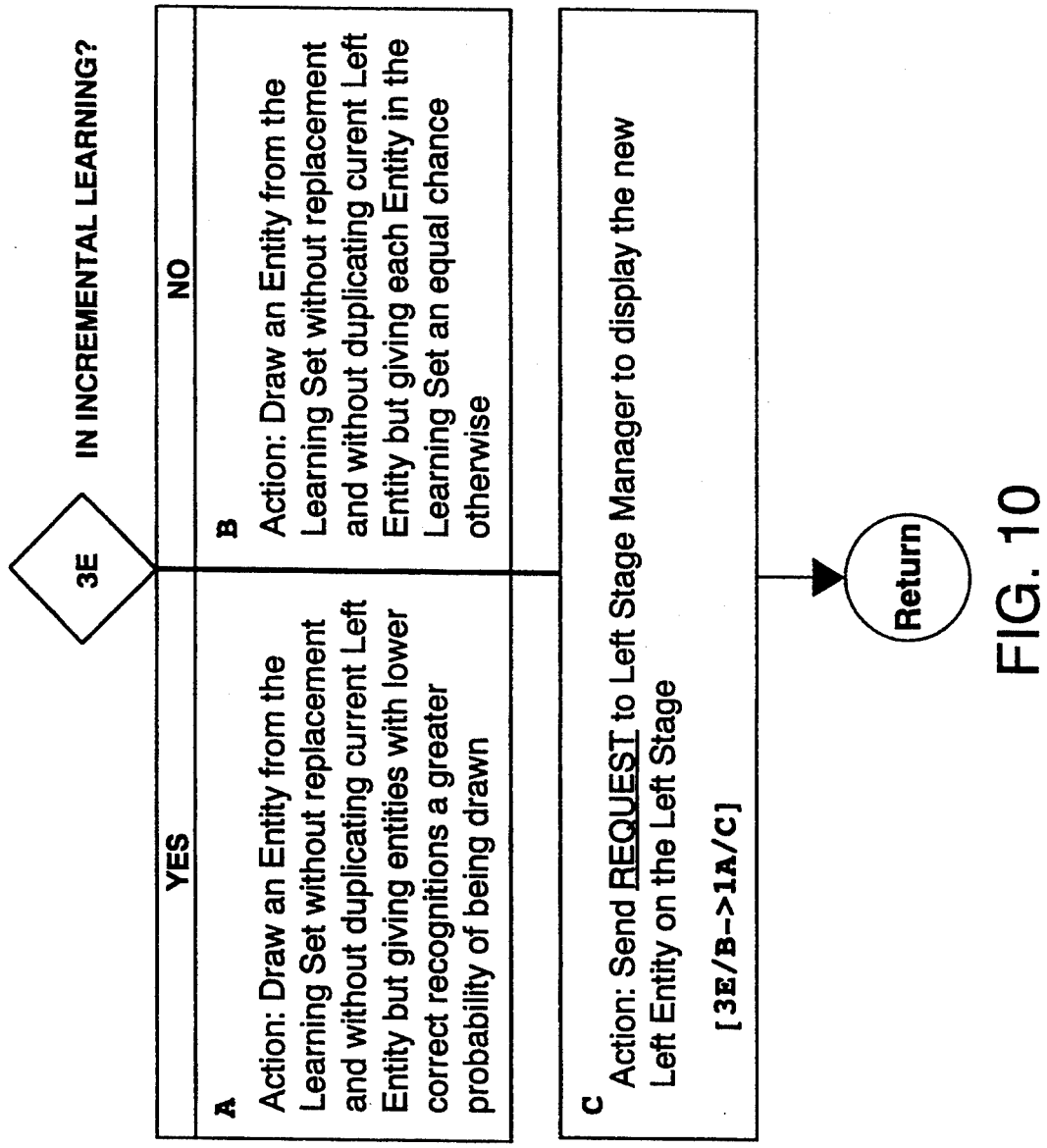

The selection of a new challenge entity will now be explained with reference to FIG. 10. Again it must first be determined if the INCREMENTAL LEARNING function has been invoked. If so, an entity is drawn from the LEARNING SET without replacement and without duplicating the current left entity but giving entities with lower correct recognitions a greater probability of being drawn. Else if INCREMENTAL LEARNING has not been activated, an entity is drawn from the LEARNING SET without replacement and without duplicating the current left entity but giving each entity in the LEARNING SET an equal chance otherwise. Once an entity has been drawn, a request is sent to the Left Stage Manager 21 to display the new left entity on the LEFT STAGE.

Figure 9:
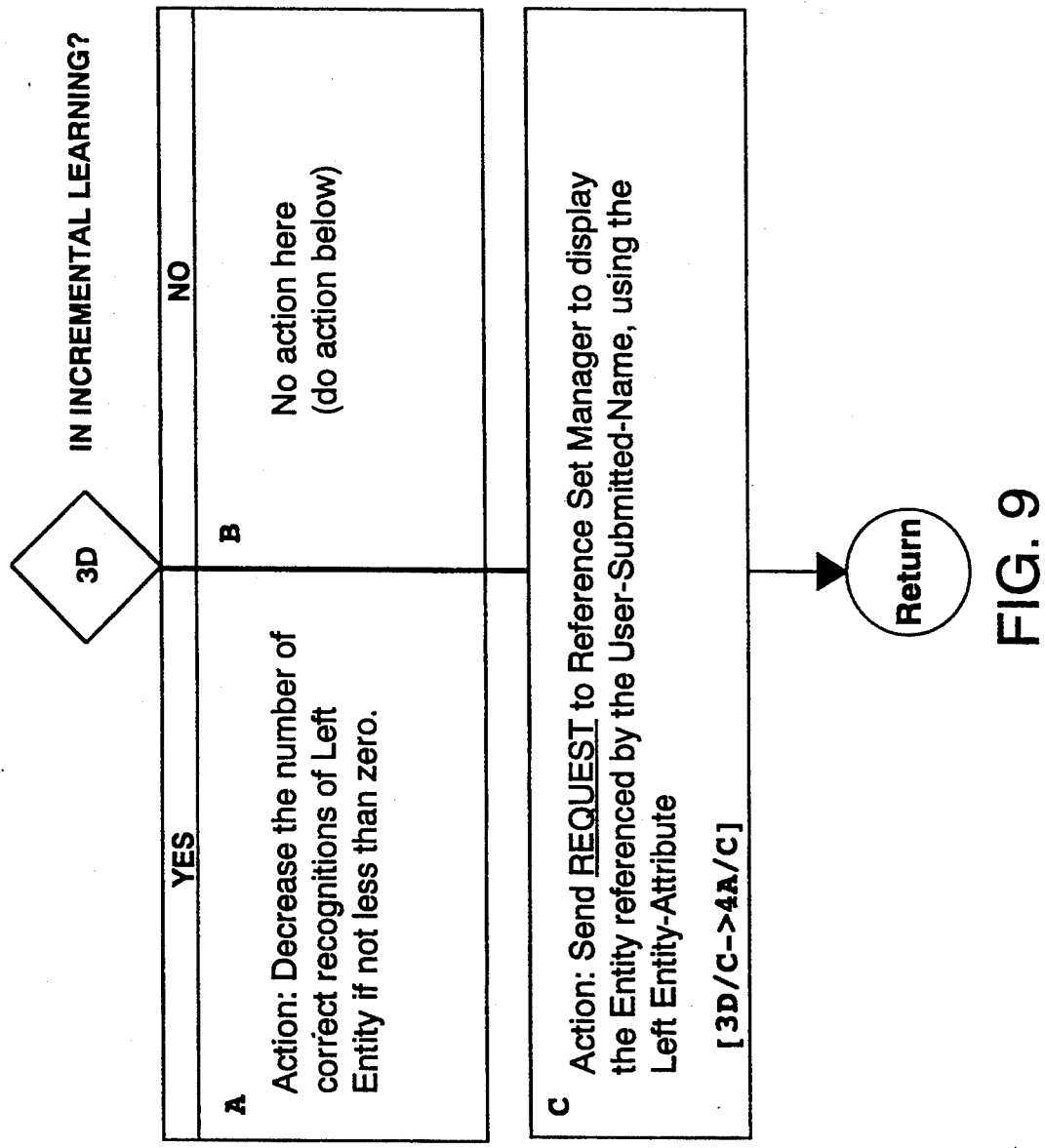

Returning to FIG. 7 section A, when a USER-SUBMITTED-NAME does not match the left ENTITY-NAME, the process logic depicted in FIG. 9 is executed to deal with the incorrect guess. In this case, if INCREMENTAL LEARNING is active, the count of correct recognitions of the left entity is decreased by one but cannot be less than zero. Then a request is sent to the Reference Set Manager 24 to display the entity identified by the USER-SUBMITTED-NAME, using the left ENTITY-ATTRIBUTE.

Figure 13:
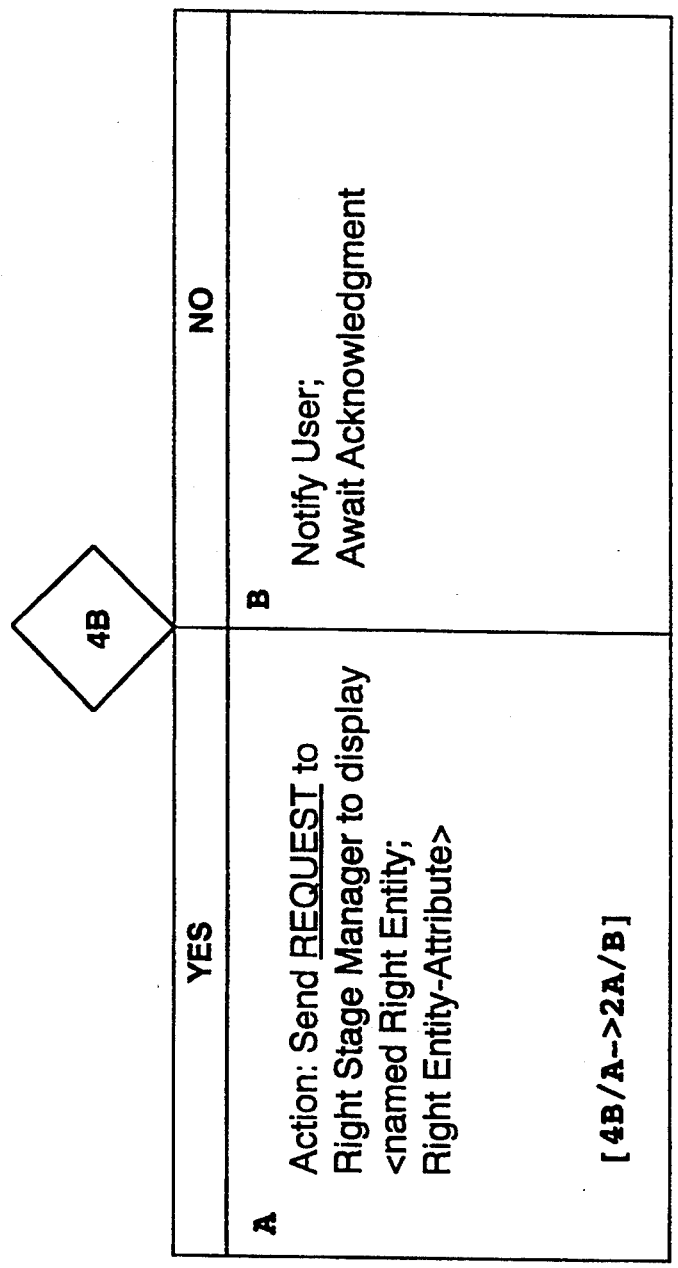
Figure 14:
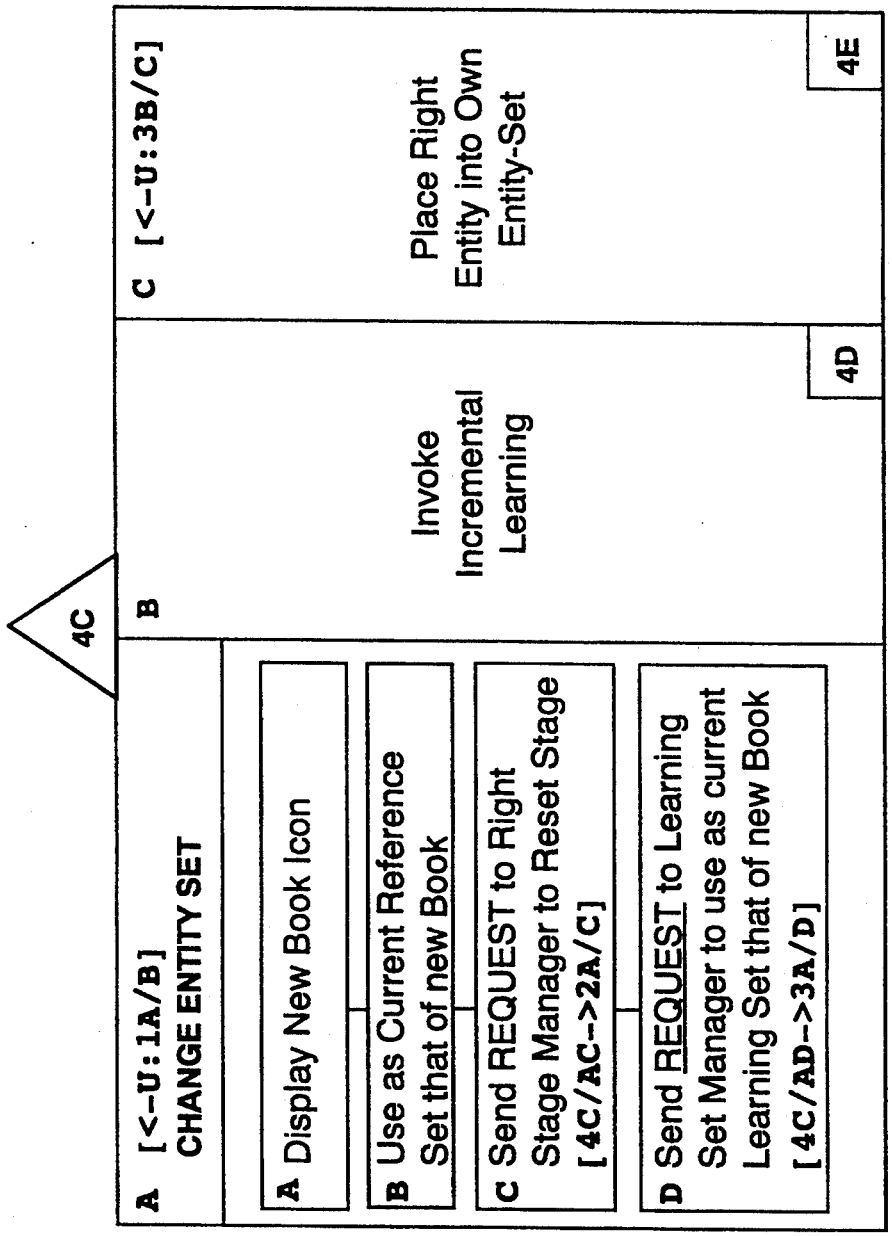
Figure 15:
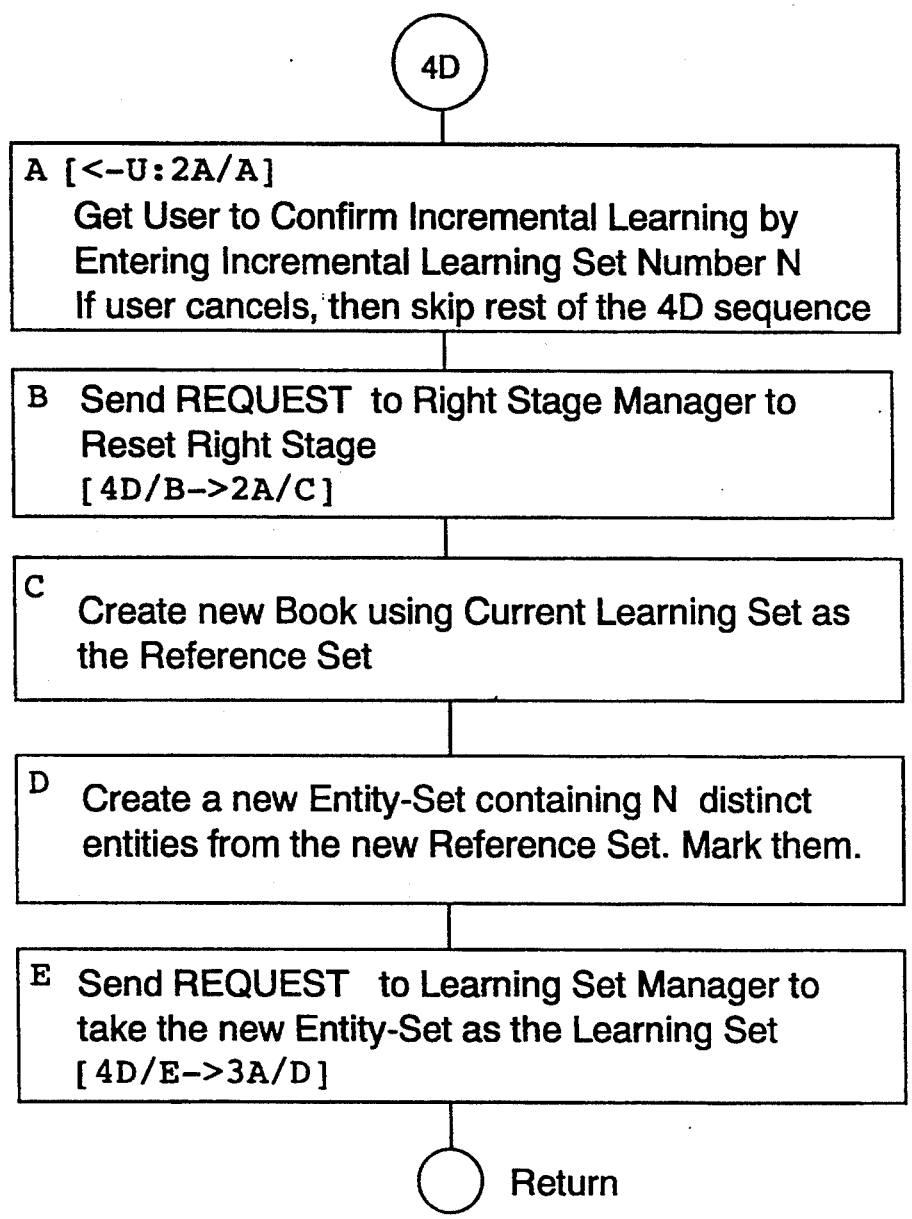
Figure 16:
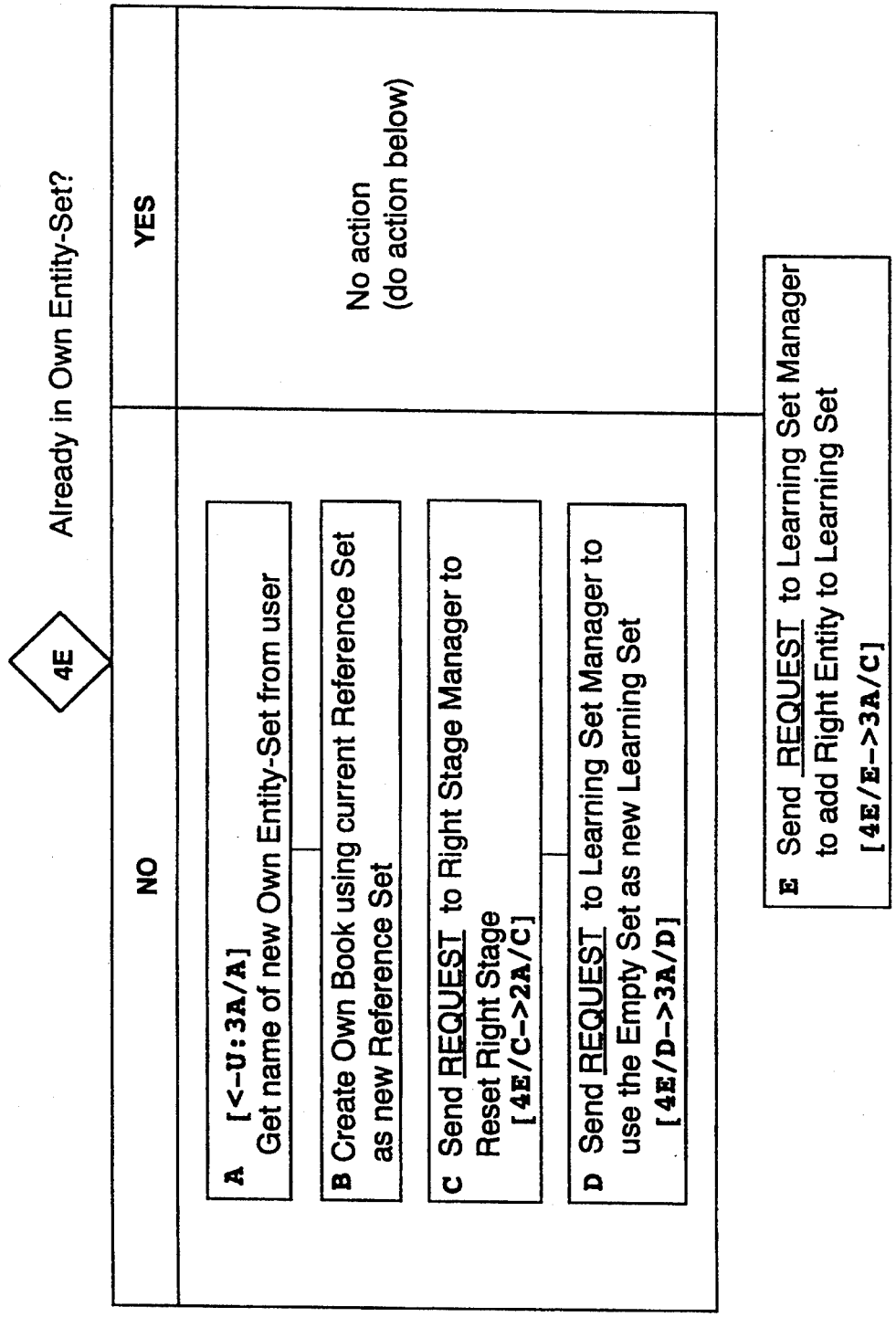

With regard to FIG. 12, the Reference Set Manager 24 process logic will now be explained in some detail. This RTS process component receives request messages from the User Proxy 20 and the Learning Set Manager 23. When the trainee enters a new USER-SUBMITTED-NAME of an entity to be displayed on the RIGHT STAGE, the User Proxy 20 passes this ENTITY-NAME to the Reference Set Manager 24 to be dealt with. FIG. 13 shows that the Reference Set Manager 24 verifies that the USER-SUBMITTED-NAME is part of the REFERENCE SET. If the entity named is not found, then the trainee is notified, else a request is sent to the Right Stage Manager 22 to display the entity on the RIGHT STAGE using the current right ENTITY-ATTRIBUTE. Other User Proxy 20 request that can be made of the Reference Set Manager 24 are as indicated in FIG. 14. They include request to: A) change the active ENTITY-SET, B) invoke incremental learning (FIG. 15), and C) place the right entity into the trainee's OWN ENTITY-SET (FIG. 16). As for the Learning Set Manager 23, the system agent may request the Reference Set Manager 24 to display the attribute associated with the ENTITY-NAME given on the RIGHT STAGE which results in a corresponding request being sent to the Right Stage Manager 22. Also the Learning Set Manager 23 can ask the Reference Set Manager 24 to retrieve a new entity for the LEARNING SET only when INCREMENTAL LEARNING has been activated. The Reference Set Manager 24 responds by drawing an entity form the REFERENCE SET without replacement and then sends a request message to the Learning Set Manager 23 to add the entity to the current LEARNING SET.

Figure 17:
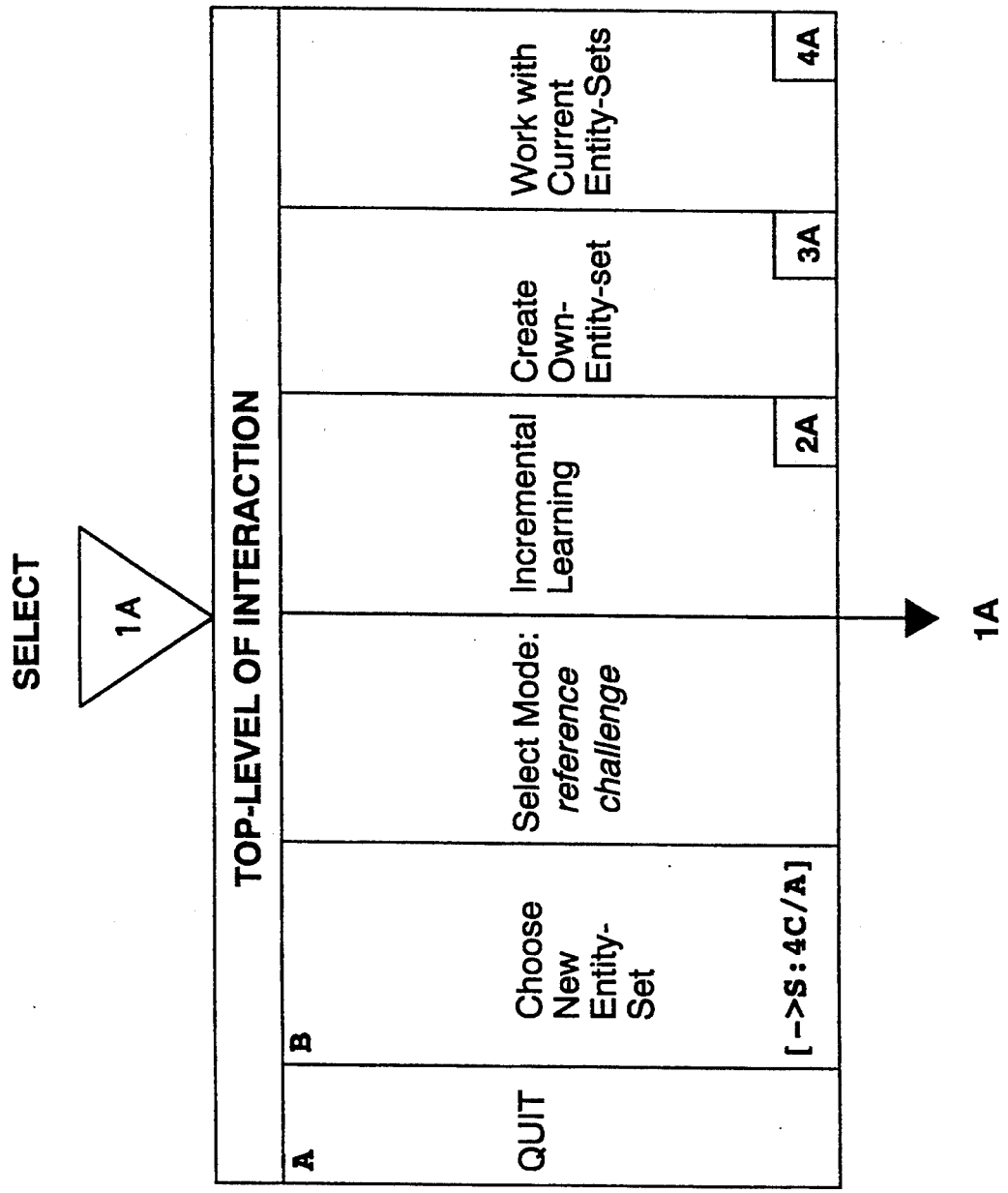
FIGS. 17 to 28 depict the overall process of the recognition training system from the user's point of view in terms of actions that can be taken at any point in time.

Turning to FIGS. 17 to 28, depicted is the overall process of the recognition training system from the user's point of view in terms of actions that can be taken at any point in time. These figures represent the choices or options that are available to the trainee using the RTS system. FIG. 17 identifies the top-level interactions available to the trainee which are as follows: quit the RTS process; choose a new entity set; select operational mode (REFERENCE or CHALLENGE); initiate INCREMENTAL LEARNING; create OWN-ENTITY-SET; and work with current ENTITY-SET (BOOK).

Figure 18:
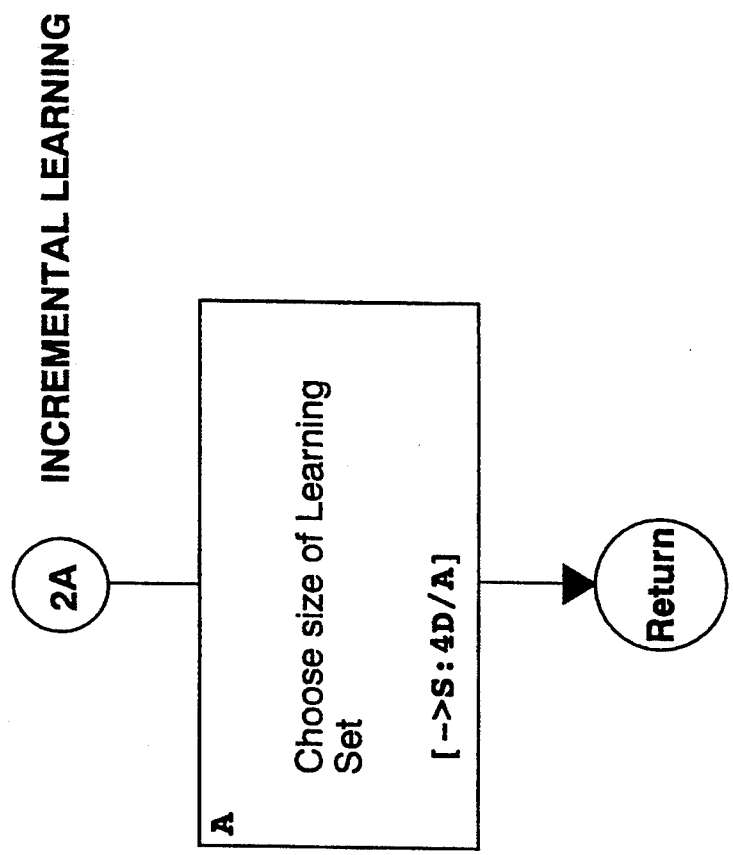

If the trainee chooses to initiate INCREMENTAL LEARNING, FIG. 18 shows the logic steps executed are to set the size of the LEARNING SET and send a request to the Reference Set Manager 24 to invoke INCREMENTAL LEARNING.

Figure 19:
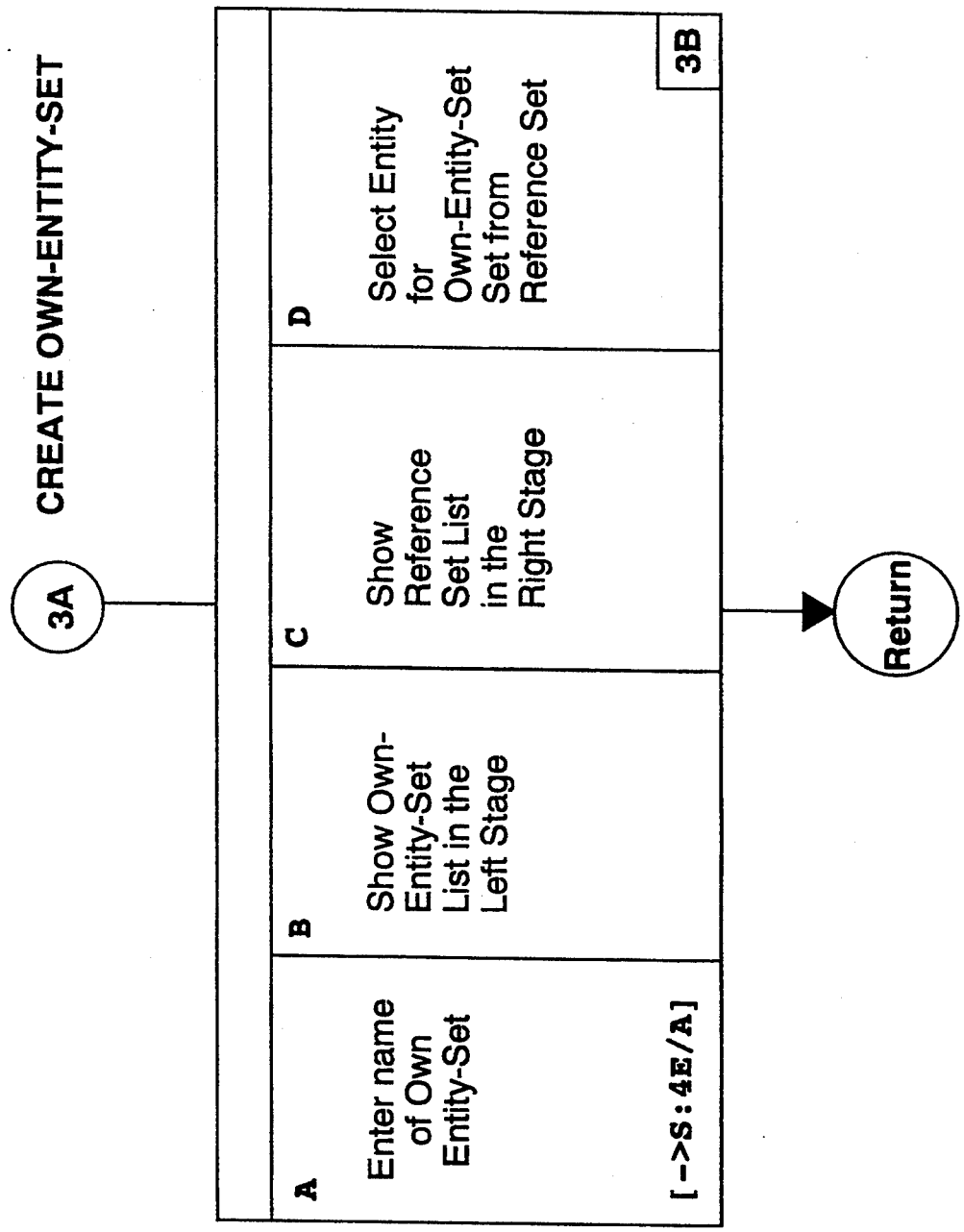

FIG. 19 shows a further level of selections that are available to the trainee once he has chosen to create an OWN-ENTITY-SET. The selections are as follows: enter name of OWN-ENTITY-SET; show OWN-ENTITY-SET list on the LEFT STAGE; show REFERENCE SET list on RIGHT STAGE; and select a new entity for the OWN-ENTITY-SET from the REFERENCE set (see FIG. 20).

Figure 20:
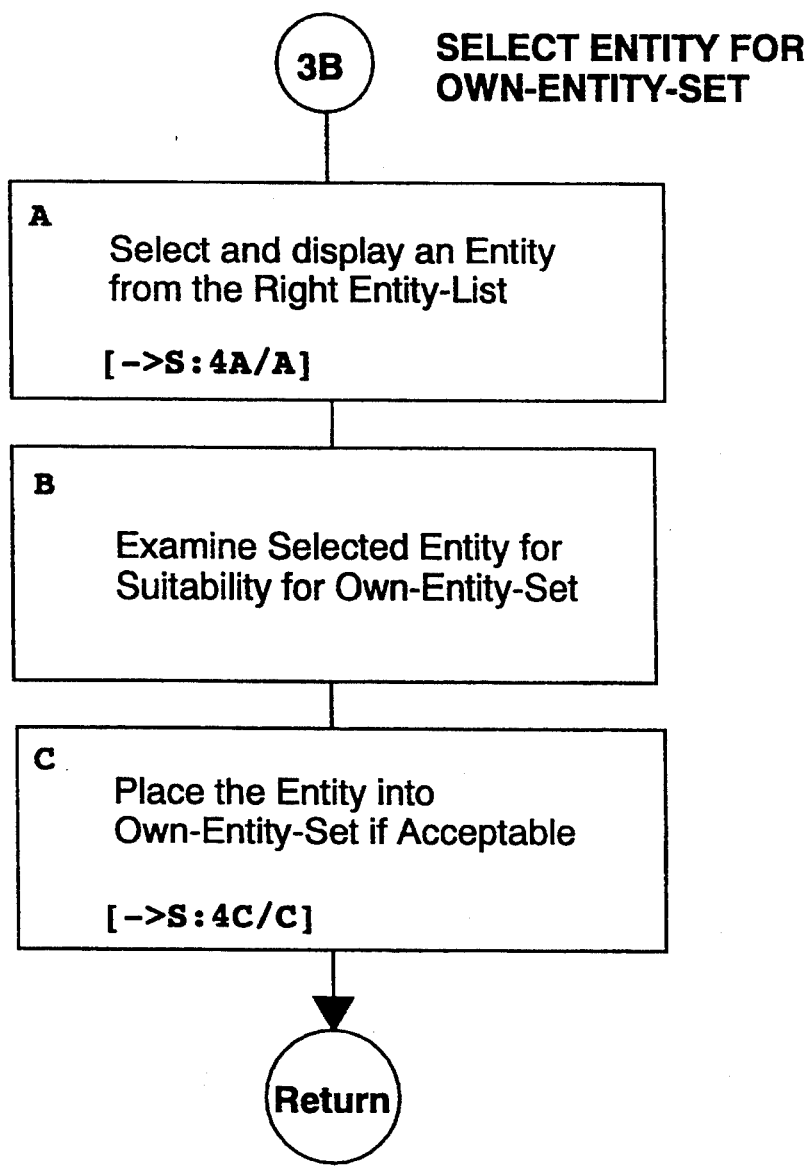
Figure 21:
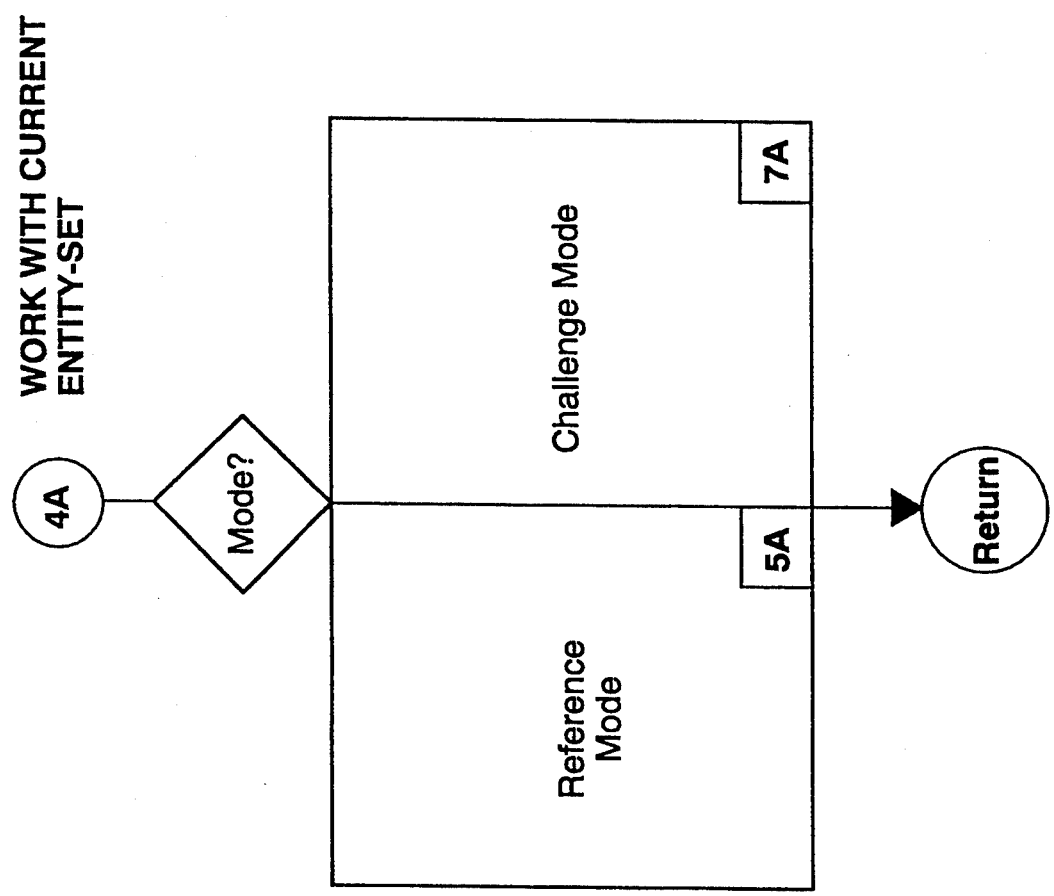
Figure 22:
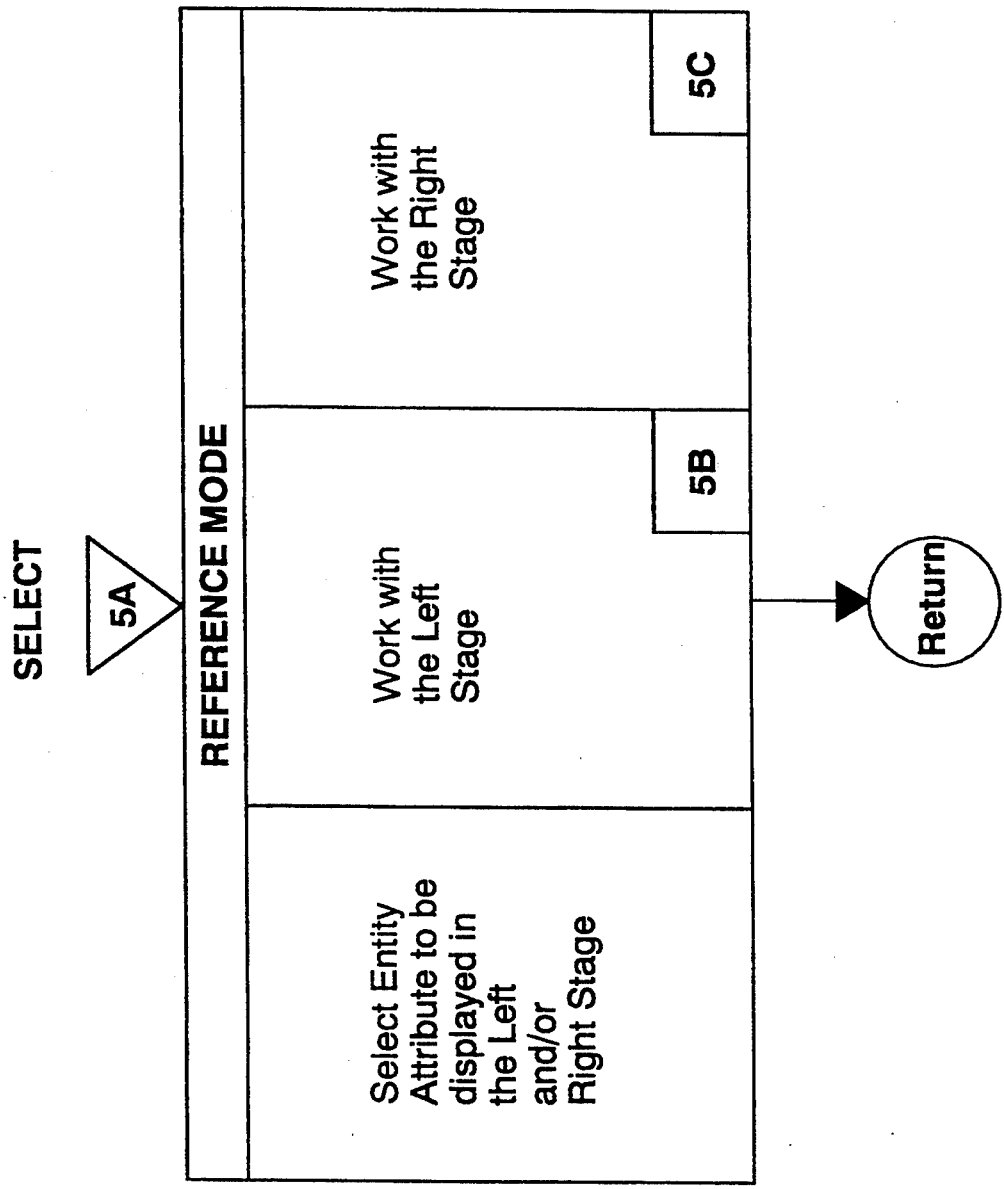
Figure 23:
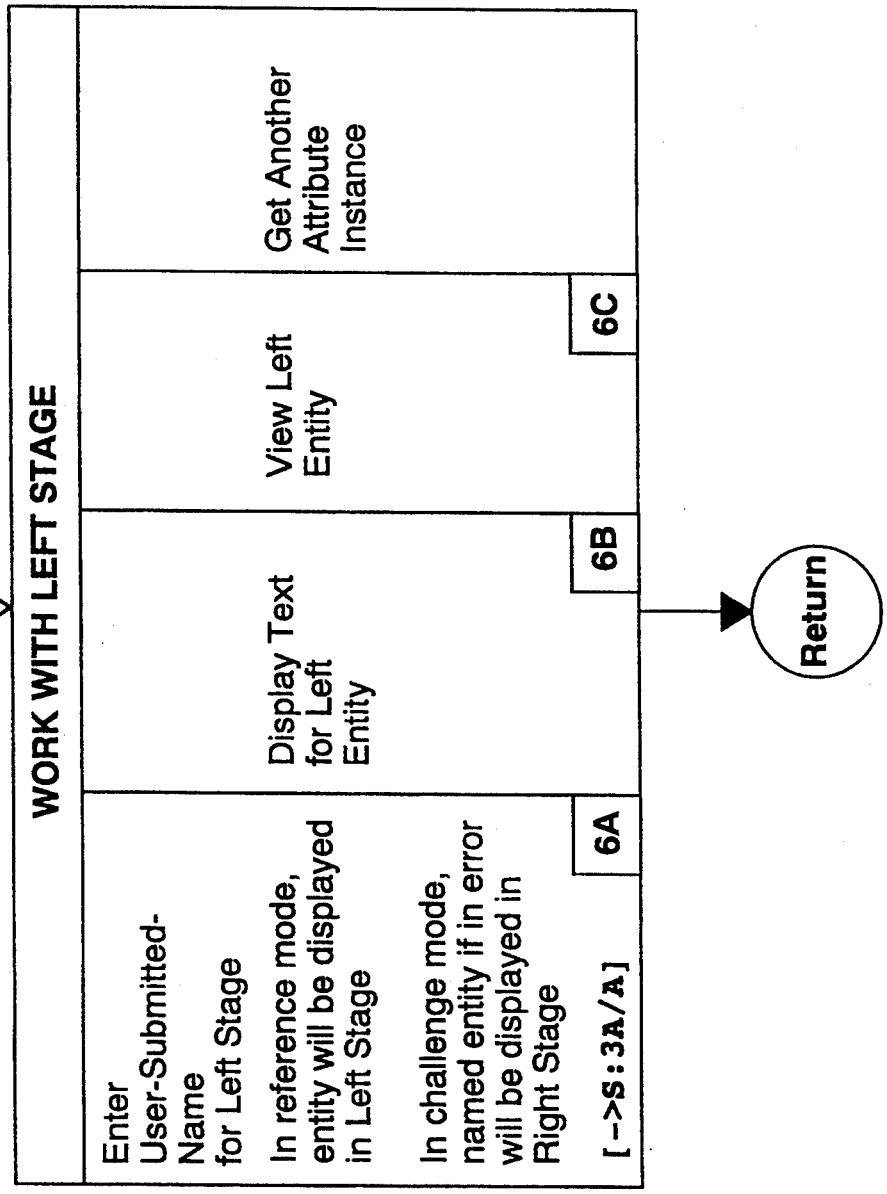
Figure 24:
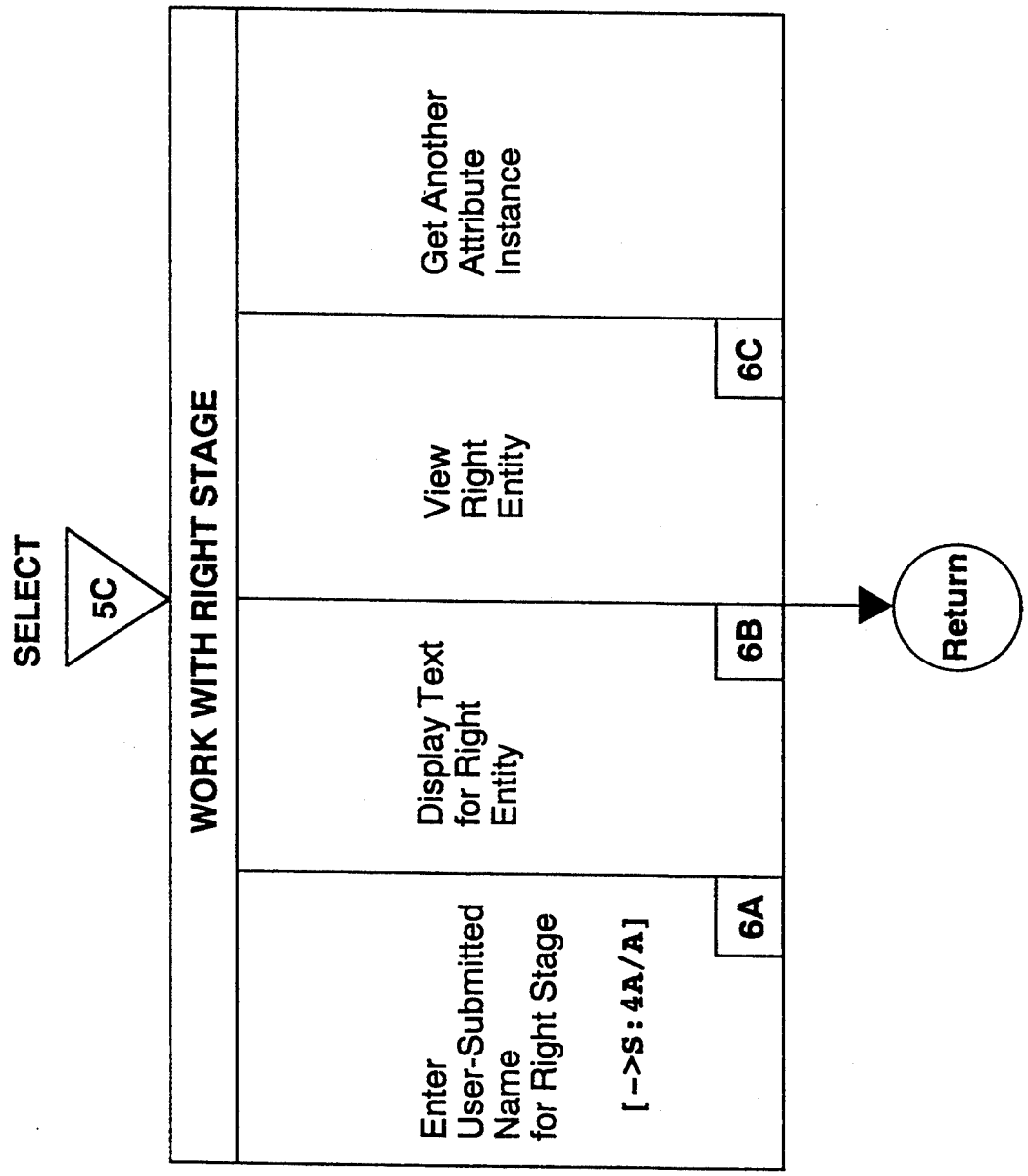
Figure 25:
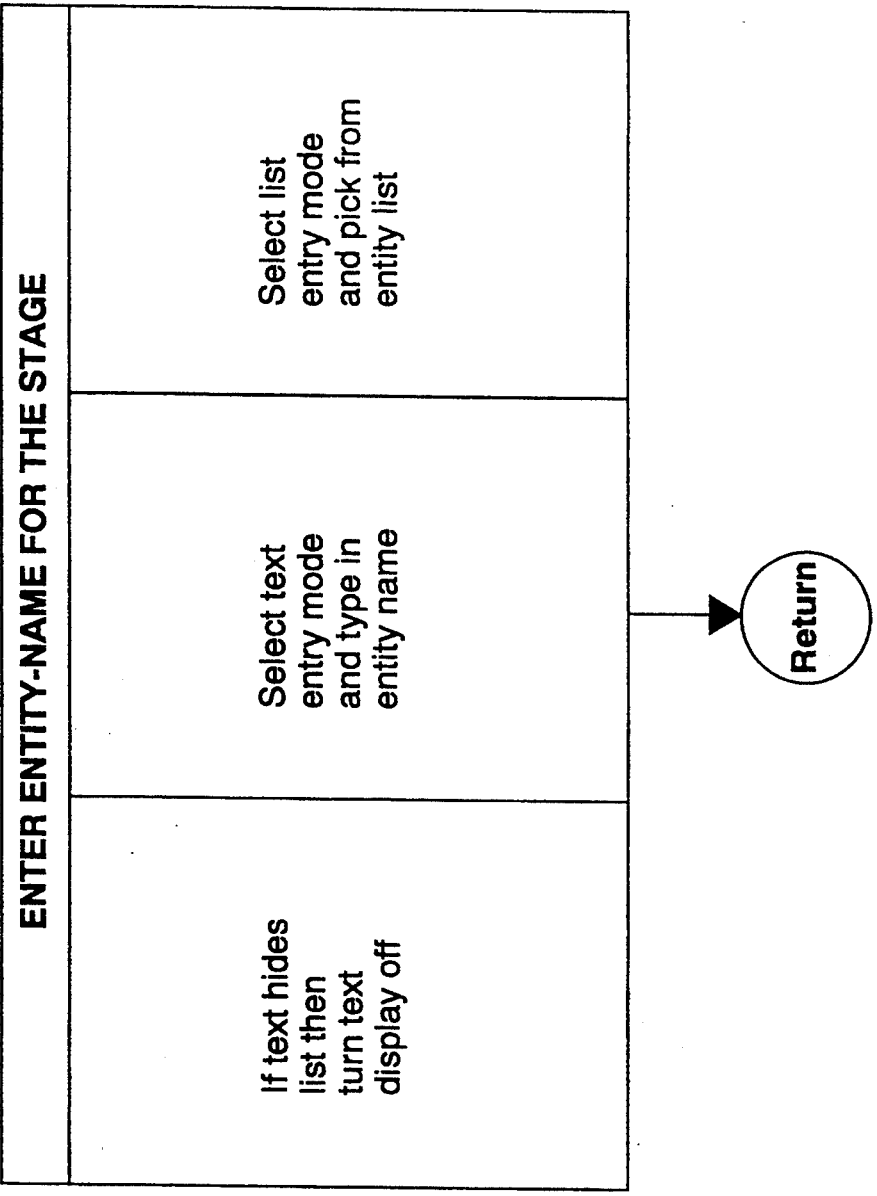
Figure 26:
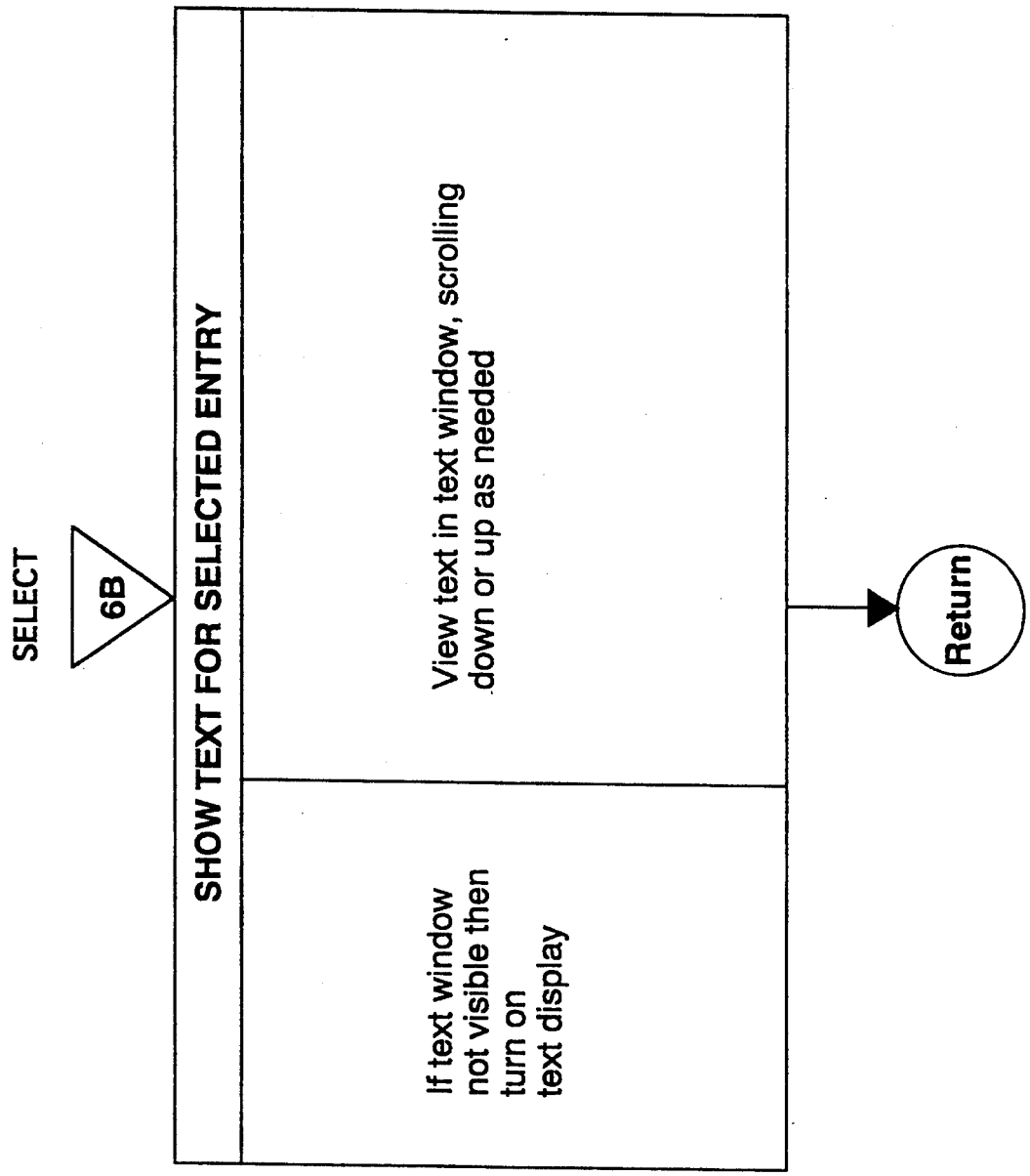
Figure 27:
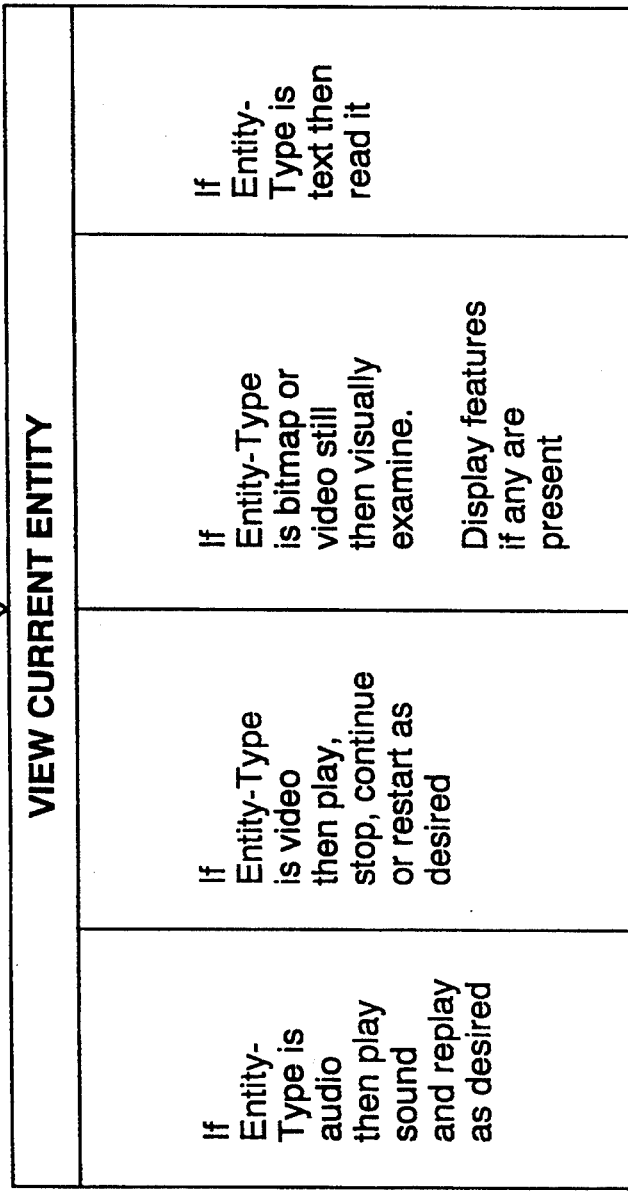

FIG. 20 expands the logic executed once the trainee begins working with the current ENTITY-SET. The first step is to determine which operational mode has been set by the trainee. FIGS. 21 through 27 explain actions that may be initiated by the trainee when RTS is operating in REFERENCE mode while FIG. 28 describes CHALLENGE mode interactions.

An exemplary realization of the recognition training system will now be described with reference to FIGS. 29 to 36. The two stage presentation capabilities of RTS are depicted as a multiple window layout on a general purpose computer video terminal. FIGS. 29 to 36 illustrate the functionality of RTS in terms of what may be presented to a trainee in a particular innovation of the system.

Figure 29:
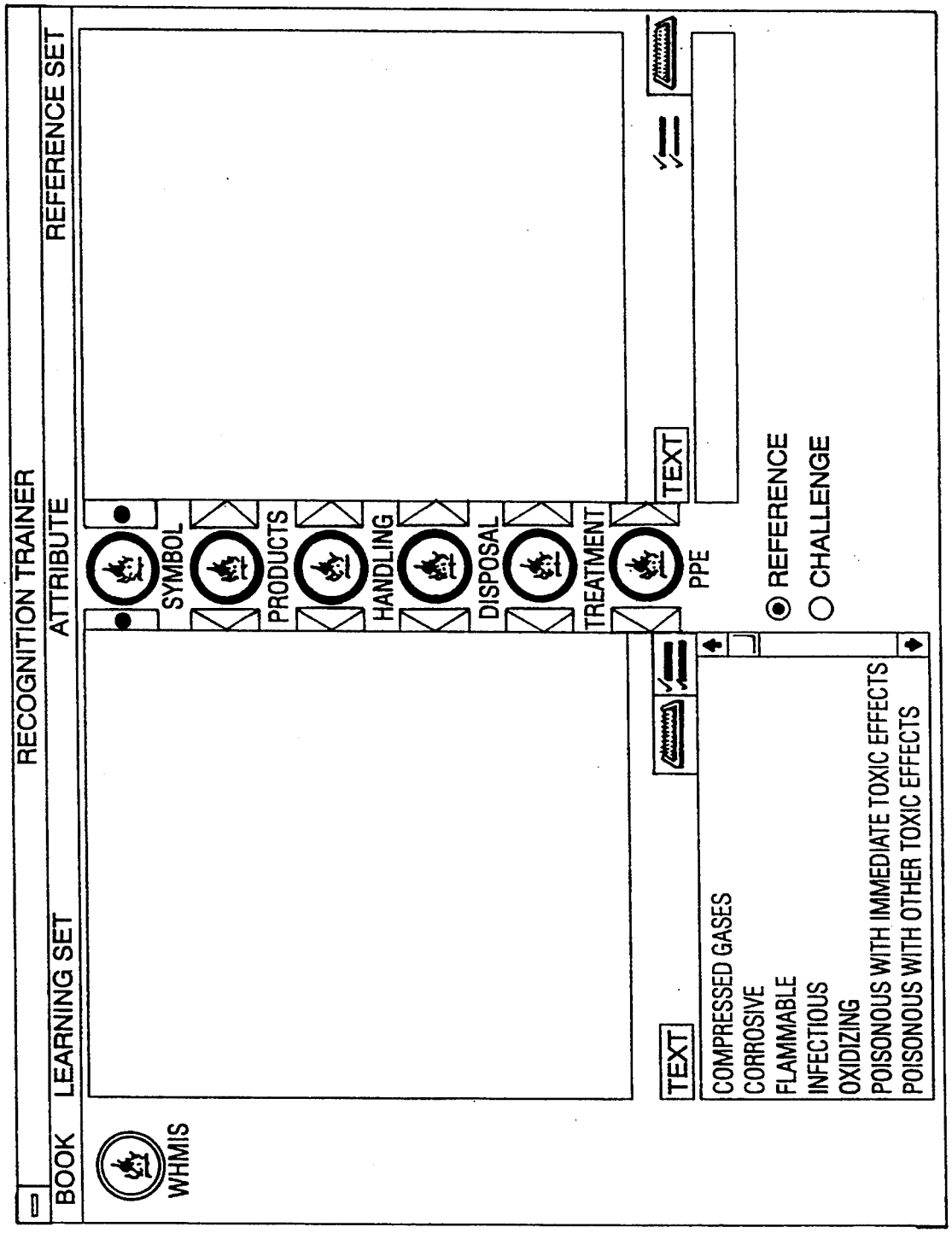
FIGS. 29 to 36 illustrate an exemplary two stage presentation of an embodiment of the recognition training system.

FIG. 29 sets the scene for the recognition training of WHMIS symbols, dealing with the labelling of hazardous materials. WHMIS stands for Workplace Hazardous Materials Information System, a regulator requirement of the Labour Code in Canada.

The LEFT STAGE is labelled LEARNING SET and the RIGHT STAGE is labelled REFERENCE SET. One BOOK is open, labelled Whims. Each entity has six ENTITY-ATTRIBUTEs, shown between the two stages and named Symbol, Products, Handling, Disposal, Treatment and PPE (Personal Protective Environments). Each ENTITY-ATTRIBUTE has a symbol to its left and right, which can be either a diamond or dark circle. The dark circle indicates the attribute currently selected for the adjacent stage. In FIG. 29, Symbol has been selected for both the LEARNING SET and REFERENCE SET.

The area immediately below the stages contain some controls. In each, there is a TEXT button for displaying (or hiding) text on the currently selected ENTITY-ATTRIBUTE in the respective stage. In addition, there are two other icons in each area. One is a TYPEWRITER symbol, and the other represents a LIST option. These specify the mode for the entry by the trainee of an ENTITY-NAME: either by typing it in, or by selecting it from a list. In FIG. 29, the LIST option has been chosen for the LEARNING SET, and the LIST of Whmis Symbol names is shown. Note that there is a vertical slider bar on the right side of the list display, which indicates that there are more names than the window can show, and the user can use the UP and DOWN arrows to get to those names not currently on-screen. These arrows may correspond to key strokes on the computer keyboard or for applications including a mouse connected to the computer, the appropriate arrow can be selected by positioning the mouse pointer on it and clicking the mouse button.

Finally, the two circles in the central area of the screen, to the right of the LEARNING SET, are labelled Reference and Challenge. The dark bullet inside the Reference circle shows that the system is in REFERENCE mode.

Figure 30:
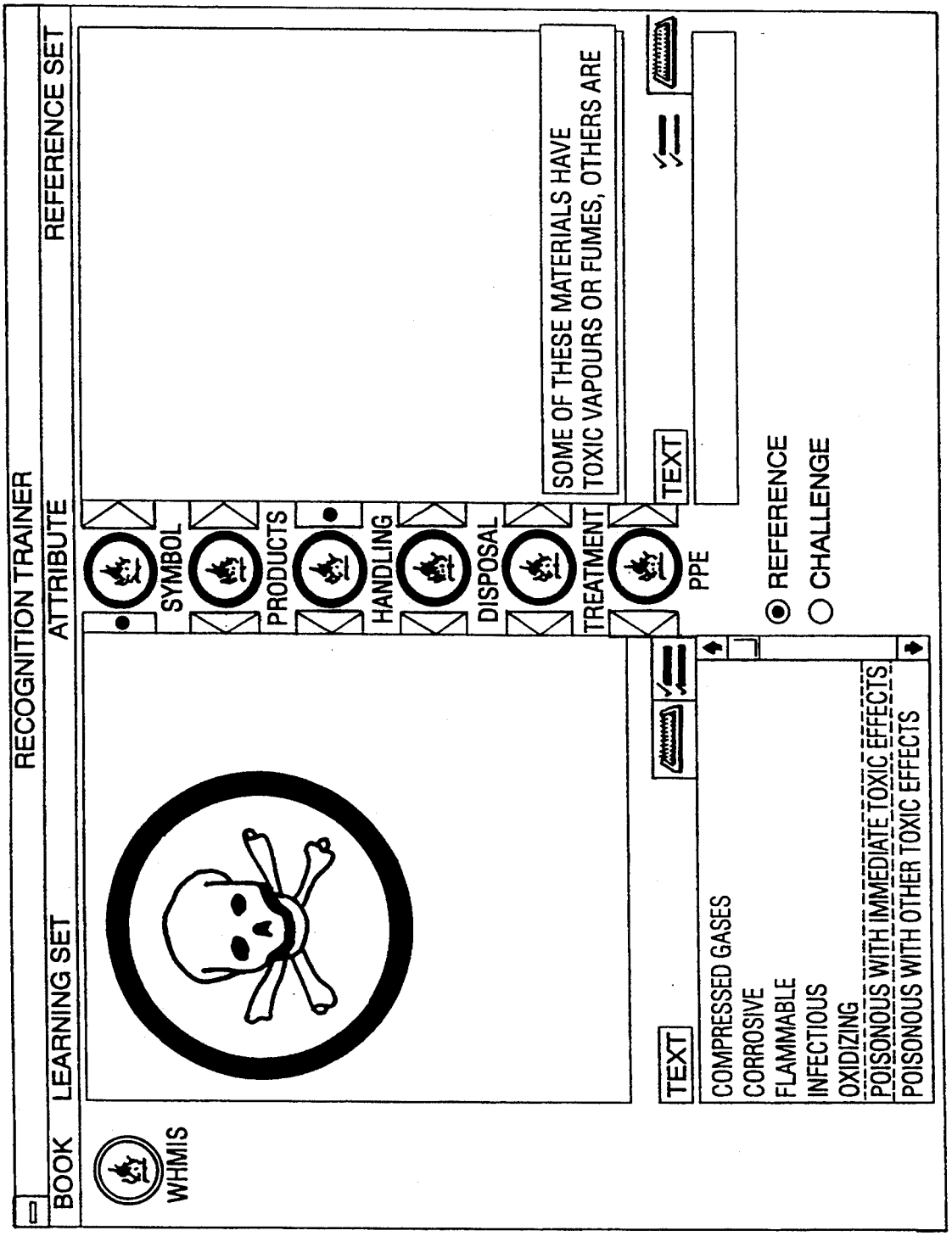

FIG. 30 shows the use of RTS in REFERENCE mode. The darker shading on the LIST item "poisonous with immediate toxic effects" shows that this named entity has been selected (through moving the mouse pointer over it and clicking the mouse button) and its associated Symbol attribute is presented in LEFT STAGE. A different attribute of that entity is automatically selected for the RIGHT STAGE. Note that the ENTITY-ATTRIBUTE Handling is shown as the having been selected attribute, and therefore what is displayed on the RIGHT STAGE is the text that deals with handling that item.

Figure 31:
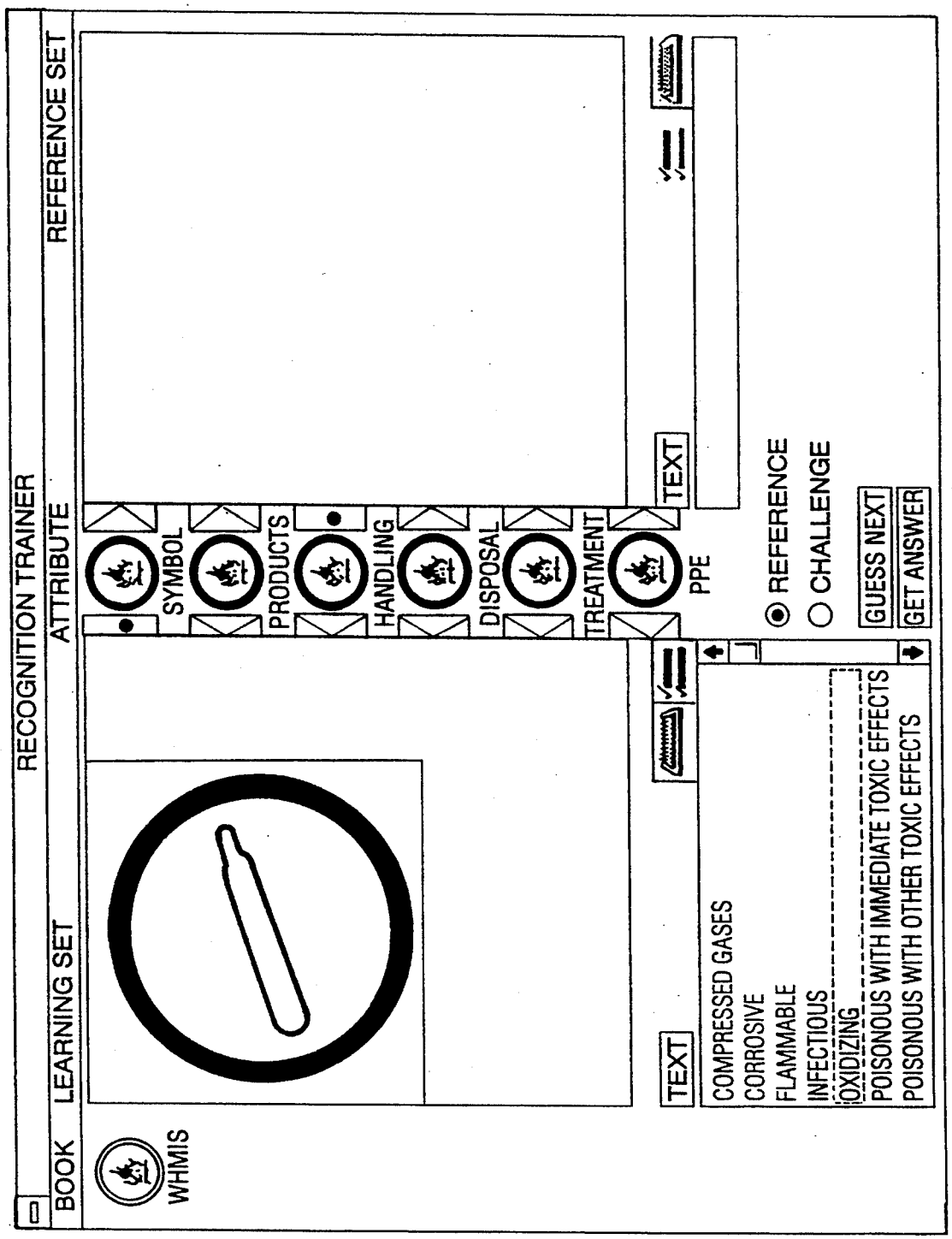

FIG. 31 shows the system being used in CHALLENGE mode. An entity is displayed on the LEFT STAGE using its Symbol ENTITY-ATTRIBUTE. The trainee has selected from the LIST of items on the LEFT STAGE the entity name "oxidizing".

Figure 32:
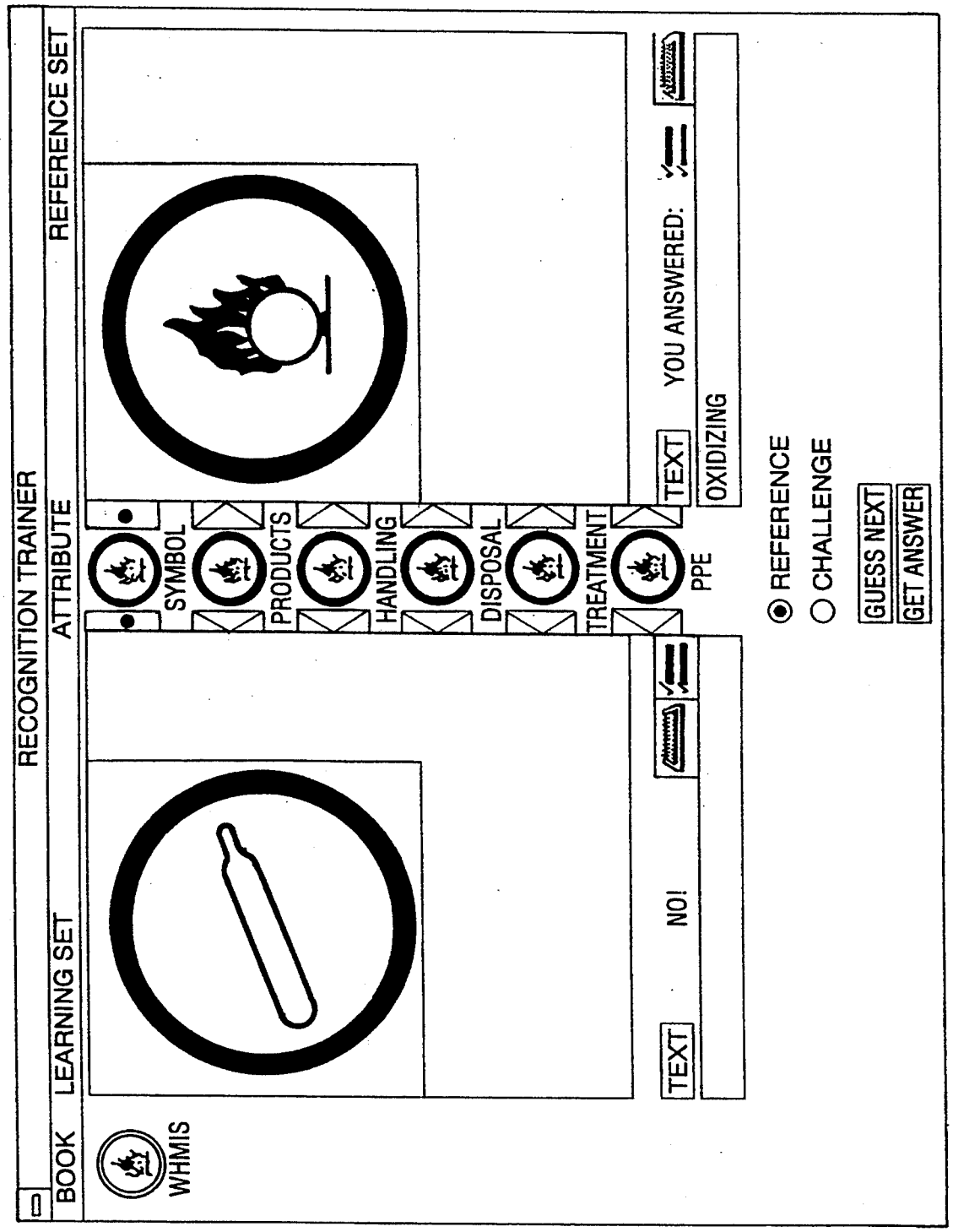

FIG. 32 shows the response of the system in CHALLENGE mode. In the area below the LEFT STAGE appear the words "No!" to indicate that the guess "oxidizing" does not correctly identify the entity being shown on the LEFT STAGE. In the area below the RIGHT STAGE are the words "You answered:" and below it in bold, "oxidizing", while in the RIGHT STAGE itself is shown the Symbol for this entity "oxidizing". The learner can now see what the Symbol for "oxidizing" is, and compare it with the target Symbol being shown in the LEFT STAGE.

Figure 33:
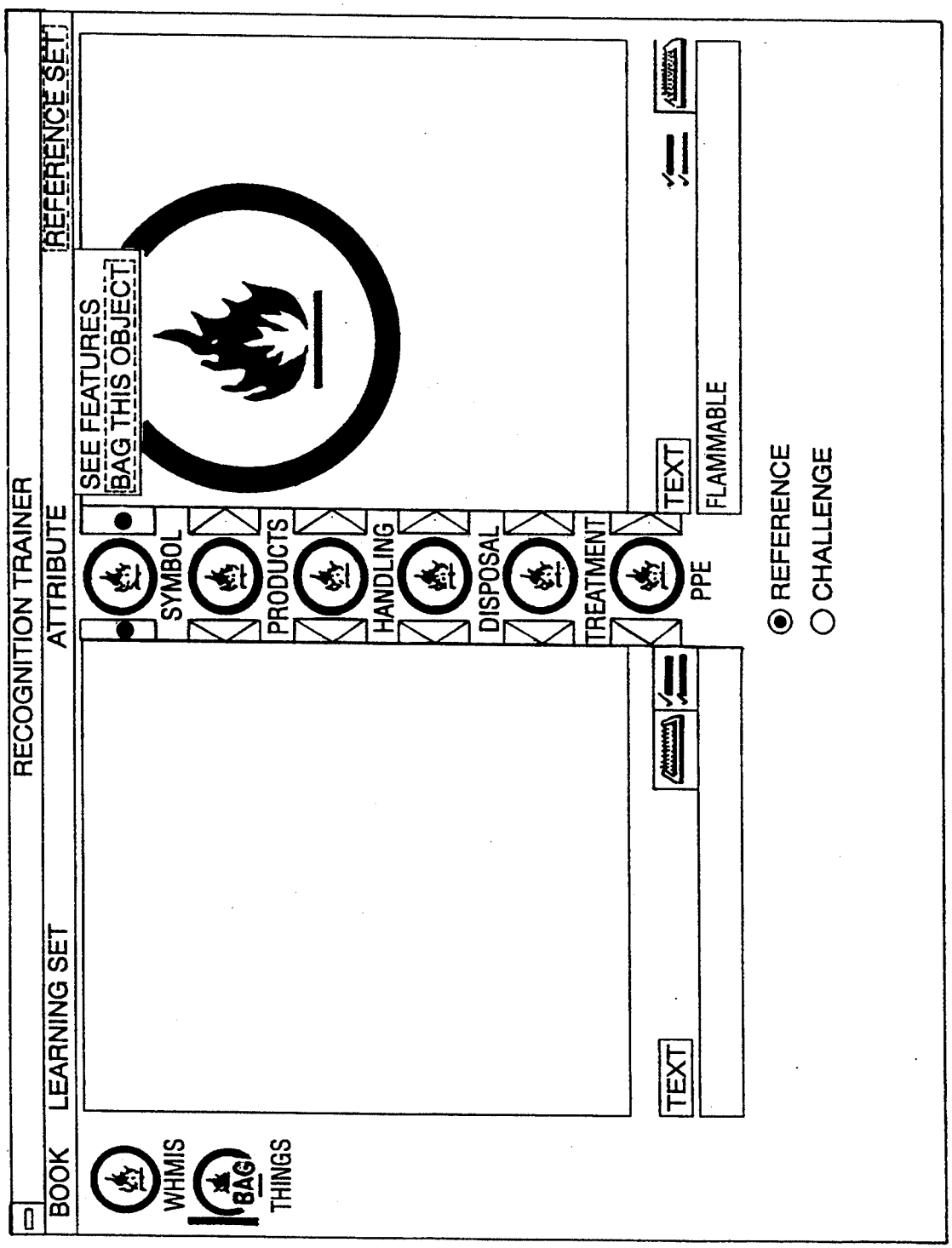

FIG. 33 shows the use of the system to create an OWN-ENTITY-SET. Note that under the major heading BOOK is another icon (symbol) containing the word BAG and under it the name Things. This is the name of the OWN-ENTITY-SET that is currently active, indicated by the horizontal dark strip on the left of this icon.

On the RIGHT STAGE, the Symbol for the entity "flammable" is shown, and the user has selected, by placing the mouse pointer over the words Reference Set and clicking it, the pull-down menu which includes the item Bag This Object. It has been selected as shown by its darker shading.

Figure 34:
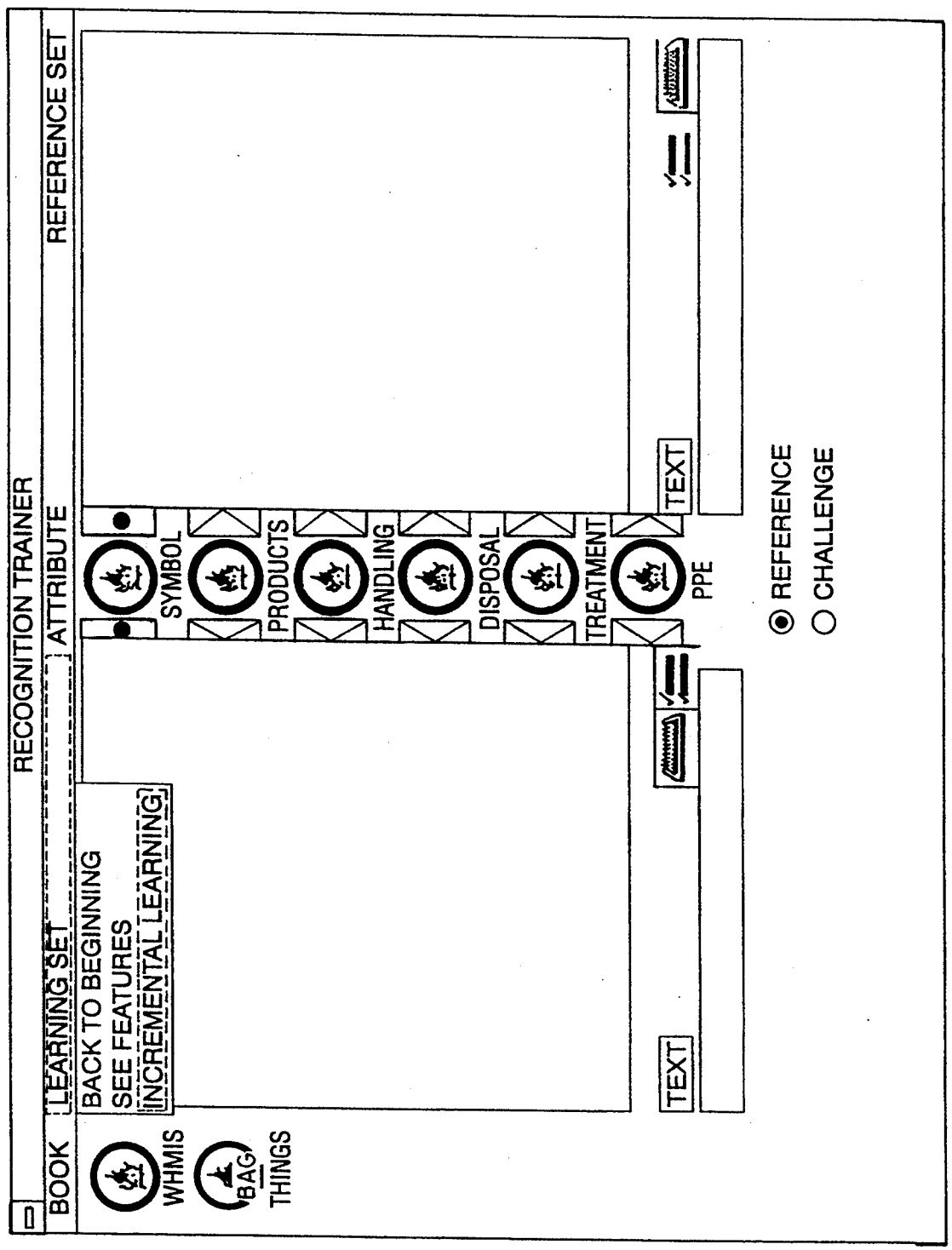

FIG. 34 shows the use of the system for INCREMENTAL LEARNING. Under the heading Learning Set is a pull-down menu which has been invoked (by moving the mouse pointer to the heading and clicking the mouse button). This menu contains the item Incremental Learning which has been selected in the same way. This item is depicted as being selected since it is shaded darker than the other menu items.

Figure 35:
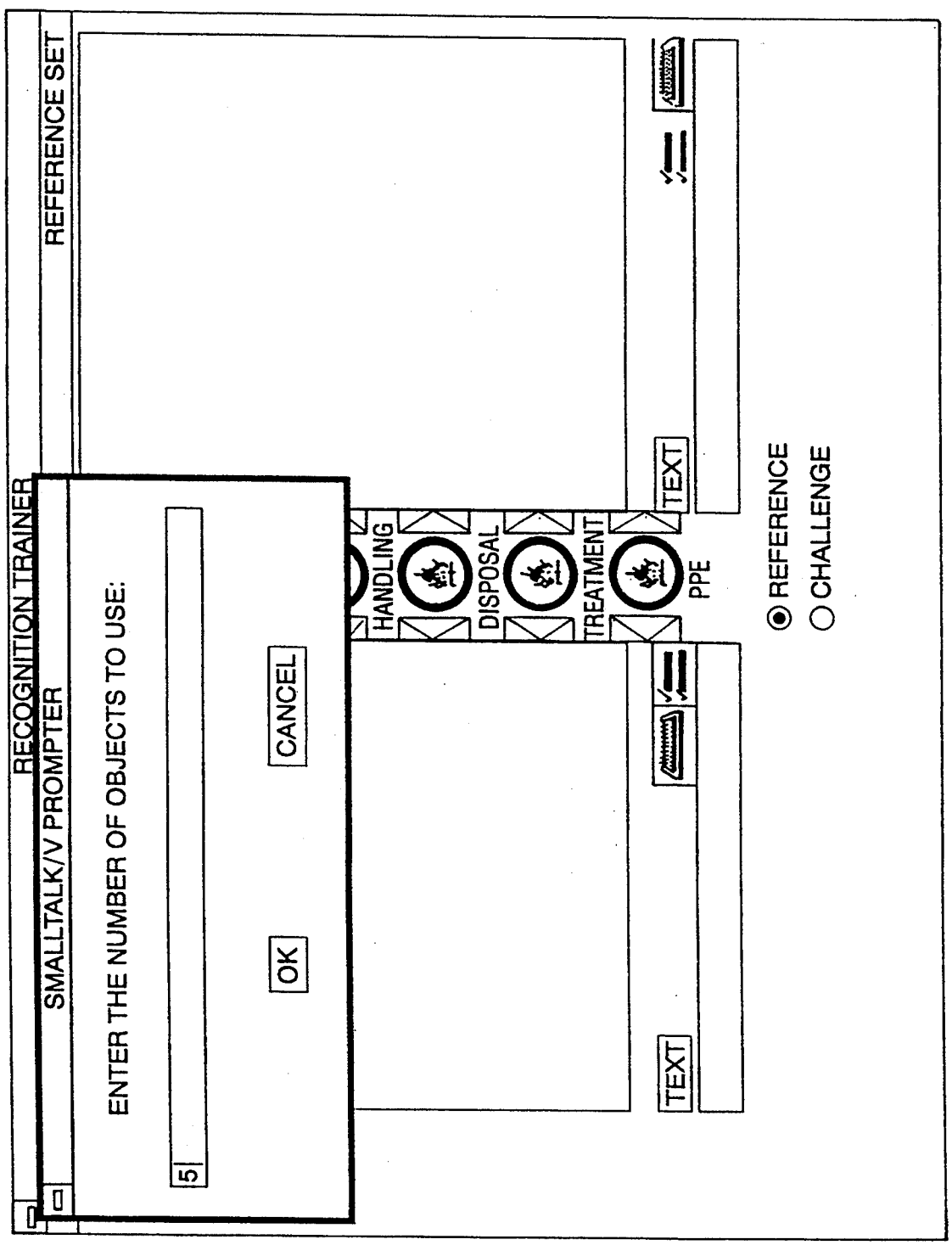

FIG. 35 shows an intermediate step after invoking INCREMENTAL LEARNING. The system asks the user to specify the size of the LEARNING SET to be use.

Figure 36:
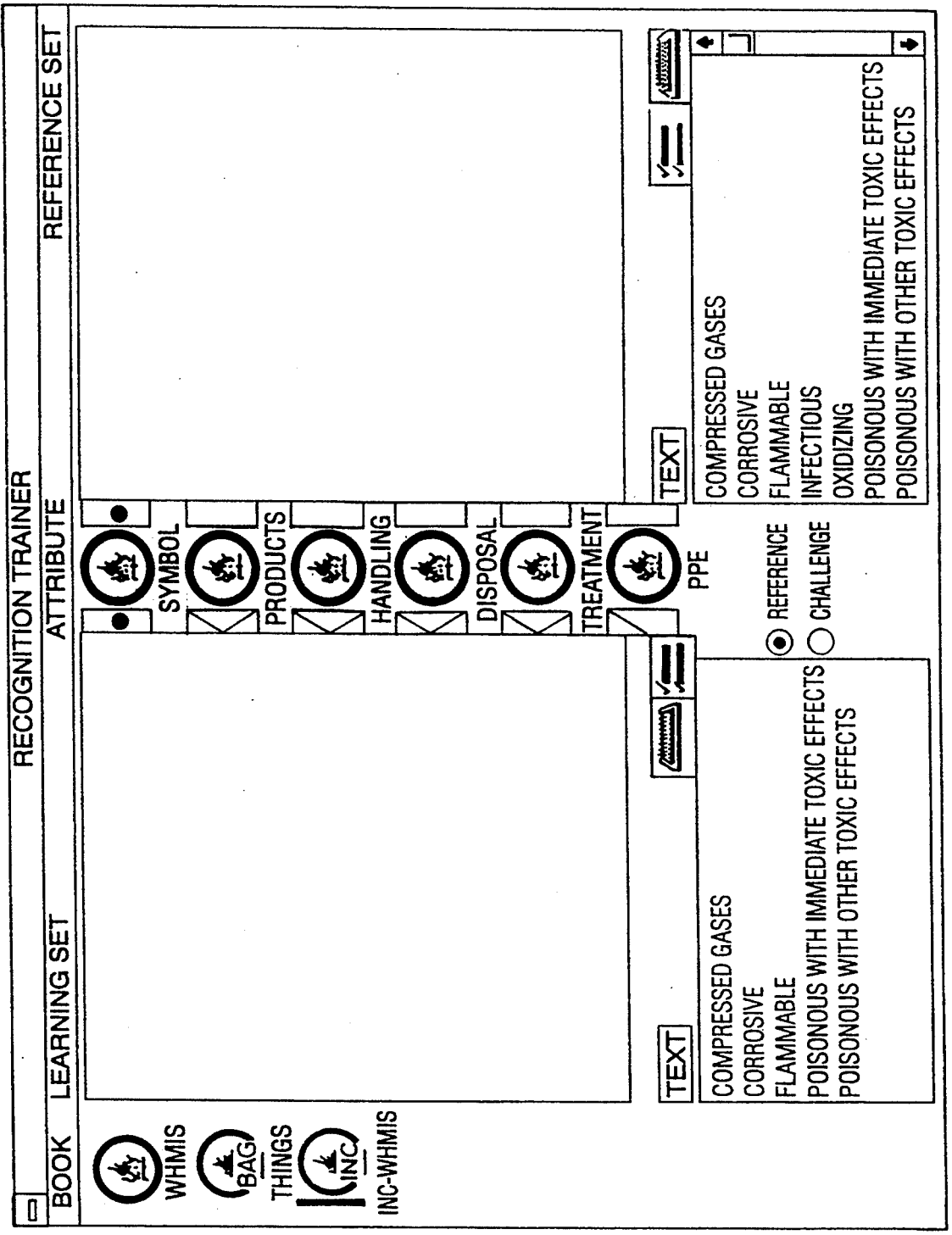

FIG. 36 shows the system while operating in INCREMENTAL LEARNING. Note that the BOOK that is called "Inc-Whmis" is the one that is open as shown by the vertical bar to the left of the icon. The LIST for the LEARNING SET shows five items chosen at random. The LIST of entity names for the REFERENCE SET is displayed and shows that the entire ENTITY-SET is available. The smaller LEARNING SET is now available for both the CHALLENGE and REFERENCE mode in the LEFT STAGE, while the entire REFERENCE SET can be used on the RIGHT STAGE (always in REFERENCE MODE).

The foregoing description has been limited to a specific embodiment of the invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What we claim is:

1. A recognition training system for teaching a trainee to identify an entity within a set of entities, said entities having one or more attributes associated therewith, comprising: a first stage and a second stage presentation means for presenting to said trainee said one or more attributes; input means used by said trainee for interacting with said recognition training system; and processing means connected to said first stage and said second stage presentation means and to said input means, said processing means operating in a first mode, wherein an attribute associated with said entity to be identified is presented to said trainee by said processing means at said first stage presentation means, said trainee attempting to identify said entity inputs an identifier via said input means, said processing means receiving said identifier determines if said identifier correctly identifies said entity presented at said first stage, and when said identifier is incorrect but does identify another entity within said set of entities, an attribute associated with said another entity is presented to said trainee at said second stage presentation means for comparison with the attribute associated with the entity to be identified.

2. A recognition training system as claimed in claim 1, comprising means for selecting by said trainee said set of entities from a group of sets.

3. A recognition training system as claimed in claim 2, comprising means for creating a new set of entities by said trainee selecting one or more entities from an existing set within said group of sets.

4. A recognition training system as claimed in claim 1, wherein said processing means selects said entity to be identified from a subset of said set of entities.

5. A recognition training system as claimed in claim 4, wherein said selection is made randomly.

6. A recognition training system as claimed in claim 4, comprising means for specifying by said trainee a size for said subset.

7. A recognition training system as claimed in claim 4, wherein said processing means replaces said entity in said subset with another entity from said set when said entity has been correctly identified by said trainee.

8. A recognition training system as claimed in claim 1, wherein types of said attributes include text, sound, bitmap image, still video and motion video.

9. A recognition training system as claimed in claim 1, comprising means for selecting by said trainee which attribute of said one or more attributes is presented at said first stage or said second stage presentation means.

10. A recognition training system as claimed in claim 1, comprising means for identifying said entity when requested by said trainee.

11. A recognition training system as claimed in claim 1, including a visual output device, wherein the first stage and second stage presentation means comprise first and second portions respectively of a display screen on said visual output device, whereby the attribute associated with said another entity is presented on said second portion while the attribute associated with said entity to be identified is still present on said first portion.

12. A recognition training system as claimed in claim 1, including an audio output device, wherein the first stage presentation means comprises the audio output device presenting at a first time an audio output corresponding to said attribute associated with said entity to be identified and the second stage presentation means comprises the audio output device presenting at a time later than the first time an audio output corresponding to said attribute associated with said another entity.

13. A recognition training system as claimed in claim 1, wherein said processing means further operates in a second mode, wherein said trainee inputs an identifier identifying a first entity, and said processing means presents an attribute associated with said first entity at said first stage presentation means.

14. A recognition training system for teaching a trainee to identify an entity within a set of entities, said entities having one or more attributes associated therewith, comprising: a first stage and a second stage presentation means for presenting to said trainee said attributes; input means used by said trainee for interacting with said recognition training system; and processing means connected to said first stage and said second stage presentation means and to said input means, wherein said trainee inputs an identifier identifying a first entity, and said processing means presents an attribute associated with said first entity at said first stage presentation means and presents another attribute associated with said first entity at said second stage presentation means.

15. A recognition training system as claimed in claim 14, comprising means for said trainee to select which attribute of said one or more attributes is presented at said first stage or said second stage presentation means.

16. A recognition training system as claimed in claim 15, comprising means for said trainee to select which attribute of said one or more attributes is presented at said first stage or said second stage presentation means.

17. A recognition training system for teaching a trainee to identify an entity within a set of entities, said entities having one or more attributes associated therewith, comprising: a first stage and a second stage presentation means for presenting to said trainee said attributes; input means used by said trainee for interacting with said recognition training system; and processing means connected to said first stage and said second stage presentation means and to said input means, wherein said trainee inputs an identifier identifying a first entity and said processing means presents an attribute associated with said first entity at said first stage presentation means, and said trainee inputs another identifier identifying a second entity and said processing means presents an attribute associated with said second entity at said second stage presentation means.

18. A recognition training system as claimed in claim 13, wherein operating in said second mode, said processing means presents another attribute associated with said first entity at said second stage presentation means.

19. A recognition training system as claimed in claim 18, wherein said processing means chooses said another attribute at random and said another attribute is different than said attribute presented at said first stage presentation means.

20. A recognition training system as claimed in claim 19, comprising means for said trainee to select which attribute of said one or more attributes is presented at said first stage or said second stage presentation means.

21. A recognition training system as claimed in claim 13, wherein operating in said second mode, said trainee inputs an identifier identifying a second entity, and said processing means presents an attribute associated with said second entity at said second stage presentation means.

22. A recognition training system as claimed in claim 21, comprising means for said trainee to select which attribute of said one or more attributes is presented at said first stage or said second stage presentation means.

23. A recognition training system as claimed in claim 13, comprising means for said trainee to select between said first mode and said second mode of operation.

24. A recognition training system as claimed in claim 9, wherein each of said one or more attributes has one or more instances, and said system including means for said trainee to select which instance is presented for said attribute selected at said first stage presentation means or for said attribute selected at said second stage presentation means.

25. A recognition training system as claimed in claim 17, wherein each of said one or more attributes has one or more instances, and said system including means for said trainee to select which instance is presented for said attribute selected at said first stage presentation means or for said attribute selected at said second stage presentation means.

26. A recognition training system as claimed in claim 19, wherein each of said one or more attributes has one or more instances, and said system including means for said trainee to select which instance is presented for said attribute selected at said first stage presentation means or for said attribute selected at said second stage presentation means.

27. A recognition training system as claimed in claim 1, wherein said processing means randomly selects said entity to be identified from said set of entities.

28. A recognition training system for teaching a trainee to identify an entity within a set of entities, said entities having one or more attributes associated therewith and each attribute having one or more instances, comprising: an audio/visual output device having a display area divided into at least first and second display portions and having a speaker; input means used by the trainee for interacting with said recognition training system and forming part of the audio/visual output device; and processing means forming part of the audio/visual output device and connected to the display portions, speaker and input means, said processing means operating in a first mode, wherein an instance of an attribute associated with said entity to be identified is presented to said trainee by said processing means at said first display portion or at said speaker, said trainee attempting to identify said entity inputs an identifier via said input means, said processing means receiving said identifier determines if said identifier correctly identifies said entity, and when said identifier is incorrect but does identify another entity within said set of entities, an instance of an attribute associated with said another entity is presented to said trainee at said second display portion or at said speaker for comparison with the attribute associated with the entity to be identified.

29. A recognition training system as claimed in claim 28, wherein said processing means further operates in a second mode, wherein said trainee inputs an identifier identifying a first entity, and said processing means presents an instance of an attribute associated with said first entity at said first display portion or at said speaker and presents an instance of another attribute associated with said first entity at said second display portion or at said speaker.

30. A recognition training system as claimed in claim 29, wherein said processing means operating in said second mode, includes means for said trainee to input another identifier identifying a second entity and said processing means presents an instance of an attribute associated with said second entity at said second display portion or at said speaker.

31. A recognition training system as claimed in claim 30, comprising means for said trainee to select an attribute from said one or more attributes, and means to select which instance of said attribute selected is presented at said first display portion, at said second display portion or at said speaker.

* * * * *